(12) United States Patent
Lee et al.

(10) Patent No.: US 10,802,368 B2
(45) Date of Patent: Oct. 13, 2020

(54) DISPLAY PANEL AND METHOD OF MANUFACTURING THE SAME

(71) Applicant: Samsung Display Co., Ltd., Yongin-si (KR)

(72) Inventors: Jinsu Lee, Suwon-si (KR); Seungmin Lee, Seoul (KR); Kun-wook Han, Cheonan-si (KR); Basrur Veidhes, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 16/258,671

(22) Filed: Jan. 28, 2019

(65) Prior Publication Data

US 2019/0235335 A1 Aug. 1, 2019

(30) Foreign Application Priority Data

Jan. 30, 2018 (KR) .................. 10-2018-0011472

(51) Int. Cl.
*G02F 1/1362* (2006.01)
*G02F 1/1368* (2006.01)
(Continued)

(52) U.S. Cl.
CPC ...... *G02F 1/136286* (2013.01); *G02F 1/1368* (2013.01); *G02F 1/133707* (2013.01); *G02F 1/134309* (2013.01); *G09G 3/3688* (2013.01); *G02F 1/1339* (2013.01); *G02F 2001/136222* (2013.01); *G02F 2201/123* (2013.01); *G09G 2300/0426* (2013.01); *G09G 2320/0233* (2013.01)

(58) Field of Classification Search
CPC .............. G02F 2001/134345; G02F 1/133707
See application file for complete search history.

(56) References Cited

U.S. PATENT DOCUMENTS

| 2008/0007681 A1* | 1/2008 | Chen | ................. G02F 1/133707 349/129 |
| 2010/0053528 A1* | 3/2010 | Li | ..................... G02F 1/134309 349/124 |

(Continued)

FOREIGN PATENT DOCUMENTS

| KR | 10-2017-0080215 | 7/2017 |
| KR | 10-2018-0107442 | 10/2018 |

*Primary Examiner* — Alexander P Gross
(74) *Attorney, Agent, or Firm* — H.C. Park & Associates, PLC

(57) ABSTRACT

A display panel including: a base substrate having first and second regions; a color filter layer having a first color layer, and a second color layer disposed in the second region and on the first color layer; a first pixel electrode disposed on the color filter layer and in the first region; and a second pixel electrode disposed in the first region and between the first pixel electrode and the second region. The first pixel electrode includes first branches spaced apart at a first pitch, and second branches spaced apart at a second pitch, the second pixel electrode includes third branches spaced apart at a third pitch and extended in the same direction as the first branches, and fourth branches spaced apart at a fourth pitch and extended in the same direction as the second branches, and the first and third pitches are different from each other.

11 Claims, 12 Drawing Sheets

(51) Int. Cl.
*G02F 1/1343* (2006.01)
*G02F 1/1337* (2006.01)
*G09G 3/36* (2006.01)
*G02F 1/1339* (2006.01)

(56) References Cited

U.S. PATENT DOCUMENTS

| | | | |
|---|---|---|---|
| 2013/0293822 A1* | 11/2013 | Chung | G02F 1/133707 349/144 |
| 2014/0346496 A1* | 11/2014 | Ro | H01L 27/1248 257/43 |
| 2015/0370116 A1* | 12/2015 | Chae | G02F 1/13394 349/43 |
| 2016/0195784 A1* | 7/2016 | Kang | G02F 1/133707 349/43 |
| 2018/0275471 A1 | 9/2018 | Park et al. | |

* cited by examiner

FIG. 3
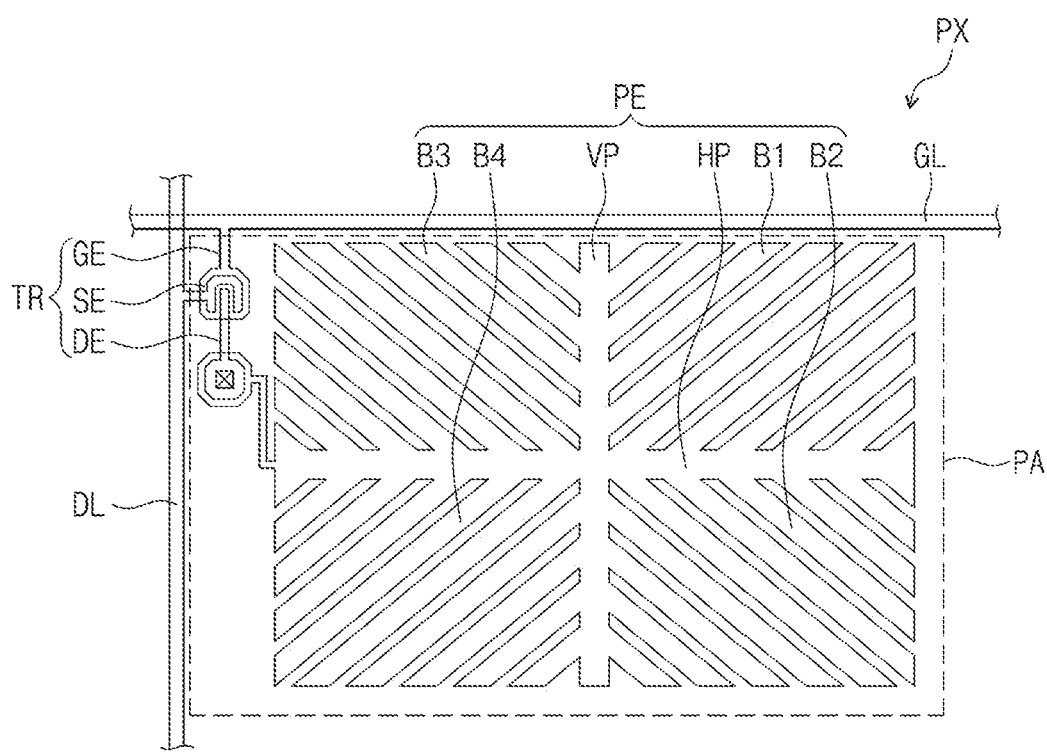
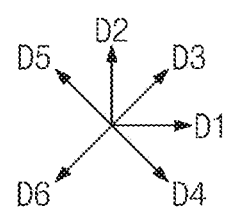

DISPLAY PANEL AND METHOD OF MANUFACTURING THE SAME

CROSS-REFERENCE TO RELATED APPLICATION

This application claims priority from and the benefit of Korean Patent Application No. 10-2018-0011472, filed on Jan. 30, 2018, which is hereby incorporated by reference for all purposes as if fully set forth herein.

BACKGROUND

Field

Exemplary embodiments of the present invention relate to a display panel and a method of manufacturing the same, and more particularly, to a display panel for displaying uniform luminance and a method of manufacturing the same.

Discussion of the Background

A liquid crystal display device is currently one of the most widely used flat panel display devices, and includes a liquid crystal display panel that has two substrates facing each other and a liquid crystal layer interposed between the substrates. A liquid crystal display panel displays an image by applying a voltage to an electric field generating electrode to generate an electric field in a liquid crystal layer, thereby determining an alignment direction of liquid crystal molecules of the liquid crystal layer and controlling polarization of incident light.

A liquid crystal display panel may form, at a single pixel, a plurality of domains in which alignment directions of liquid crystal are different. In each domain, liquid crystal molecules are generally aligned in the same direction. The intensity of alignment of the liquid crystal molecules may vary depending on the area of an electric field generating electrode.

The above information disclosed in this Background section is only for understanding of the background of the inventive concepts, and, therefore, it may contain information that does not constitute prior art.

SUMMARY

Exemplary embodiments of the inventive concept provide a display panel having a uniform luminance distribution on the entire surface of a display region.

Exemplary embodiments of the inventive concept also provide a method of manufacturing a display panel for which each pixel electrode may have a different design.

Additional features of the inventive concepts will be set forth in the description which follows, and in part will be apparent from the description, or may be learned by practice of the inventive concepts.

An exemplary embodiment of the inventive concept provides a display panel including: a base substrate having a first region and a second region adjacent to the first region; a color filter layer having a first color layer overlapping the first region and the second region, and a second color layer disposed in the second region and on the first color layer; a first pixel electrode disposed on the color filter layer and in the first region; and a second pixel electrode disposed in the first region and between the first pixel electrode and the second region. The first pixel electrode includes first branches spaced apart at a first pitch and second branches spaced apart at a second pitch different from the first pitch. The second pixel electrode includes third branches that are spaced apart at a third pitch and extend in the same direction as the first branches, and fourth branches that are spaced apart at a fourth pitch different from the third pitch and extend in the same direction as the second branches. The first pitch and the third pitch are different from each other.

Widths of the third branches may be larger than widths of the first branches.

The second pitch may be greater than the first pitch.

The widths of the first branches may be the same as widths of the second branches, and the widths of the third branches may be the same as widths of the fourth branches.

The display panel may further include a third pixel electrode disposed between the first pixel electrode and the second pixel electrode. The third pixel electrode may include fifth branches that extend in the same direction as the first branches and have a fifth pitch, and sixth branches that extend in the same direction as the second branches and have a sixth pitch, and the fifth pitch may have a value between the first pitch and the third pitch.

A ratio of an area occupied by the second branches to an area occupied by the first branches may be different from a ratio of an area occupied by the fourth branches to an area occupied by the third branches.

The second pitch may be greater than the first pitch, the fourth pitch may be greater than the third pitch, and the ratio of the area occupied by the fourth branches to the area occupied by the third branches may be greater than the ratio of the area occupied by the second branches to the area occupied by the first branches.

The ratio of the area occupied by the second branches to the area occupied by the first branches may be 1:1.

The color filter layer may include a step formed between the first region and the second region.

The first color layer may have the same color in a region overlapping the first pixel electrode and a region overlapping the second pixel electrode.

The first color layer may have a red color in the second region, and the second color layer may have a blue color.

The first pixel electrode may further include first additional branches having a first sub-pitch different from the first pitch and the second pitch, and the second pixel electrode may further include second additional branches that are configured to extend in the same direction as the first additional branches and have a second sub-pitch different from the third pitch and the fourth pitch.

The first sub-pitch may be greater than the first pitch and the second pitch, and the second sub-pitch may be greater than the third pitch and the fourth pitch.

Another embodiment of the inventive concept provides a display panel including: a base substrate having a first region and a second region surrounding the first region; a color filter layer having a plurality of color patterns, and a step defined between the first region and the second region; and a plurality of pixel electrodes disposed on the color filter layer and in the first region, and arranged in a row in a direction approaching the second region. Each of the pixel electrodes includes a plurality of branches spaced apart at a predetermined pitch, and the pitch is larger as a corresponding pixel electrode is closer to the second region.

An area of each of the pixel electrodes may be defined as a sum of areas of corresponding branches, and may be smaller as a corresponding pixel electrode is closer to the second region.

The pixel electrodes may include first to fourth pixel electrodes arranged in a direction approaching the second region, and pitches of the first to fourth pixel electrodes may increase in the order listed.

The fourth pixel electrode may be disposed adjacent to the step, and the first pixel electrode may have a pitch the same as a pitch of a pixel electrode that the first pixel electrode adjoins in a direction opposite to the direction approaching the second region.

Another embodiment of the inventive concept provides a method of manufacturing a display panel, the method including: forming a color filter layer having a step on a base substrate; forming a conductive layer on the color filter layer; coating the conductive layer with a photoresist film for covering the step; and providing a mask above the photoresist film so as to form a plurality of pixel electrodes from the conductive layer. The mask includes slit patterns respectively corresponding to the pixel electrodes, the pixel electrodes include first to fourth pixel electrodes arranged in a row in a direction approaching the step, and a slit pattern corresponding to the first pixel electrode has a pitch different from a pitch of a slit pattern corresponding to the fourth pixel electrode.

The first to fourth pixel electrodes may respectively include branches having the same width, and the slit patterns may correspond to the branches.

The photoresist film may have a thickness gradually increasing toward the step, and the mask may include a slit pattern having a pitch gradually decreasing toward the step.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to describe principles of the inventive concept.

FIG. 3 is a plan view schematically illustrating a part of the display panel according to an exemplary embodiment of the inventive concept.

DETAILED DESCRIPTION

Figure 1A:
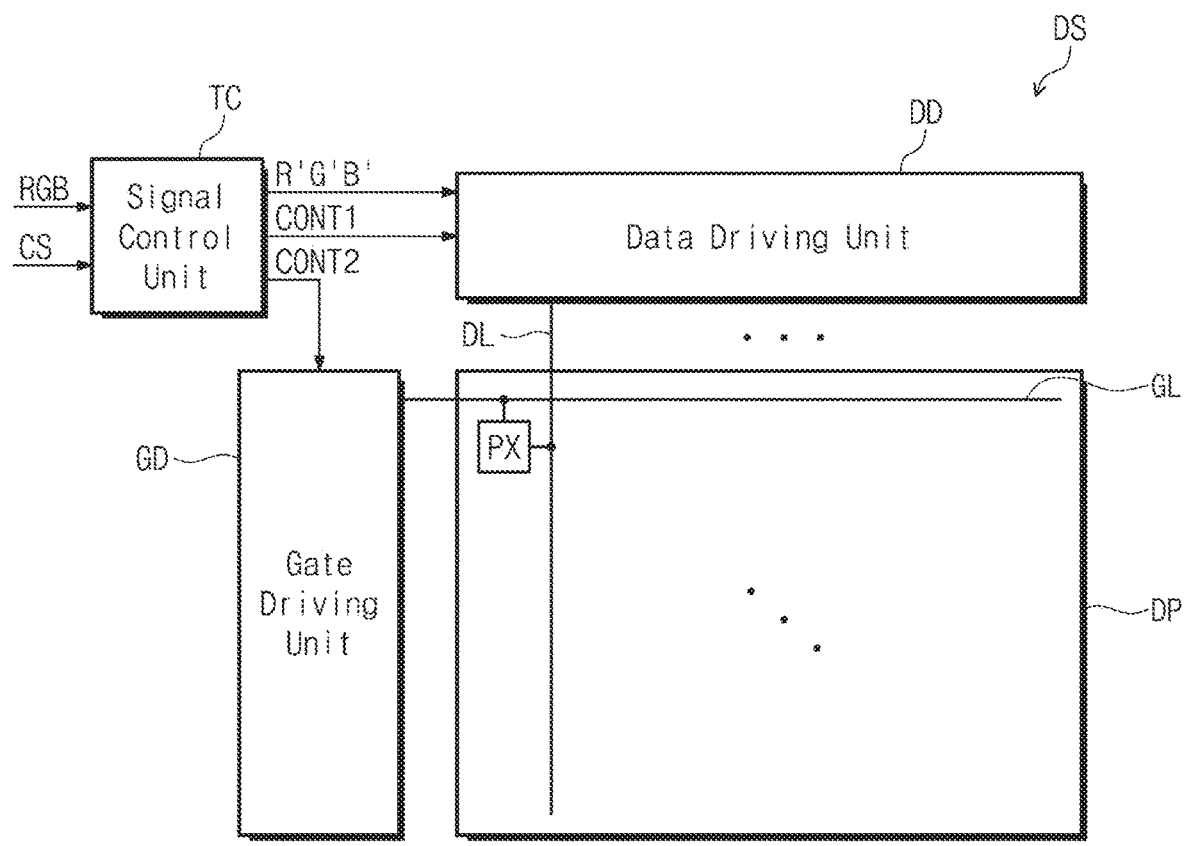
FIG. 1A is a block diagram schematically illustrating a display device according to an exemplary embodiment of the inventive concept.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Figure 1B:
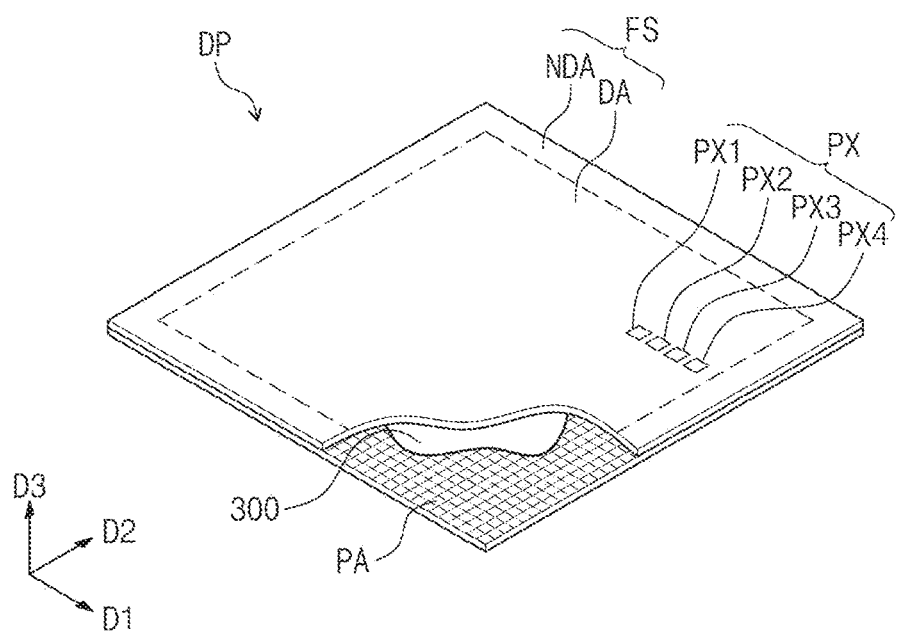
FIG. 1B is a perspective view schematically illustrating a display panel according to an exemplary embodiment of the inventive concept.
Figure 2A:
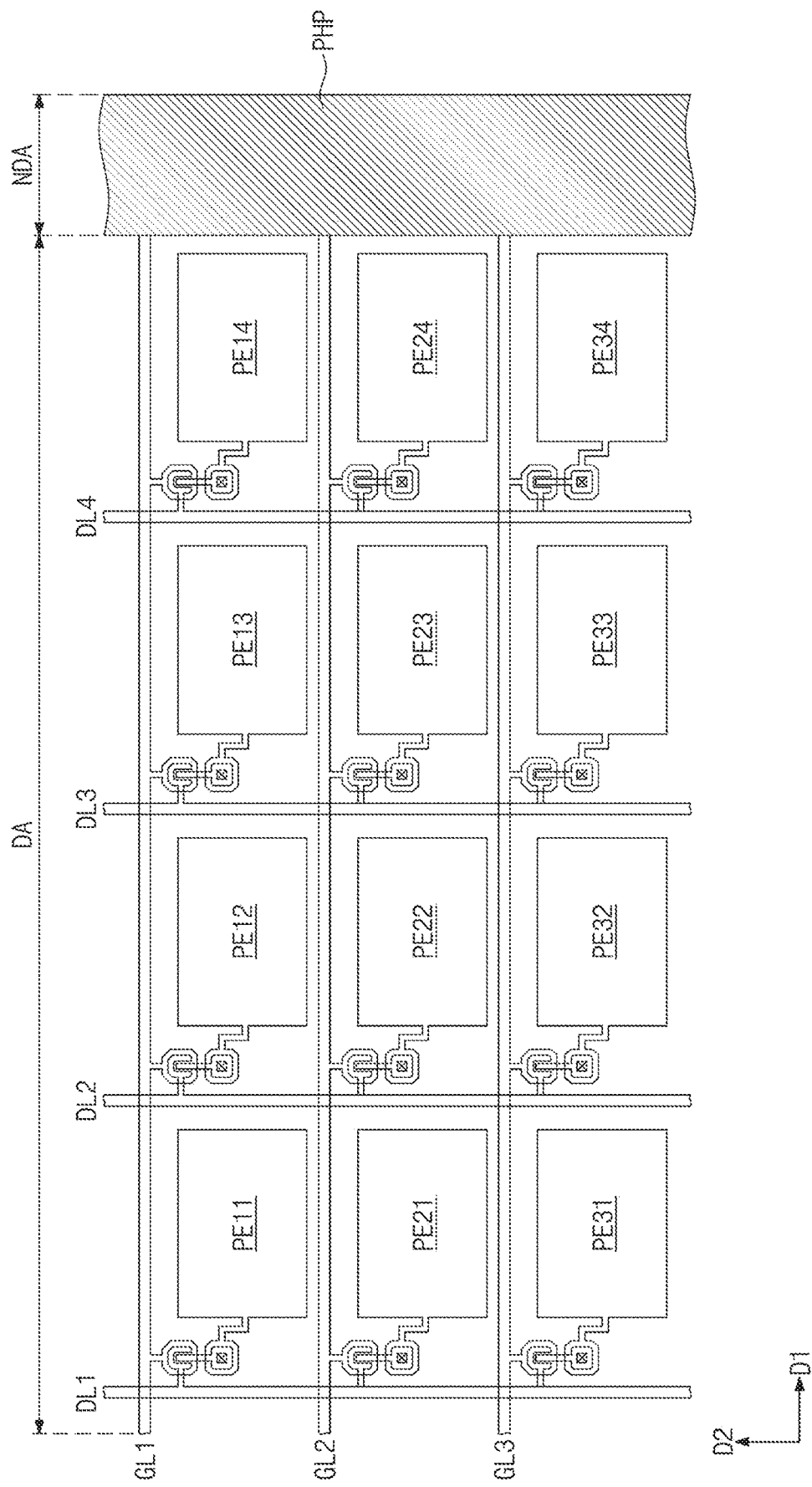
FIG. 2A is a plan view illustrating a part of FIG. 1B.
Figure 2B:
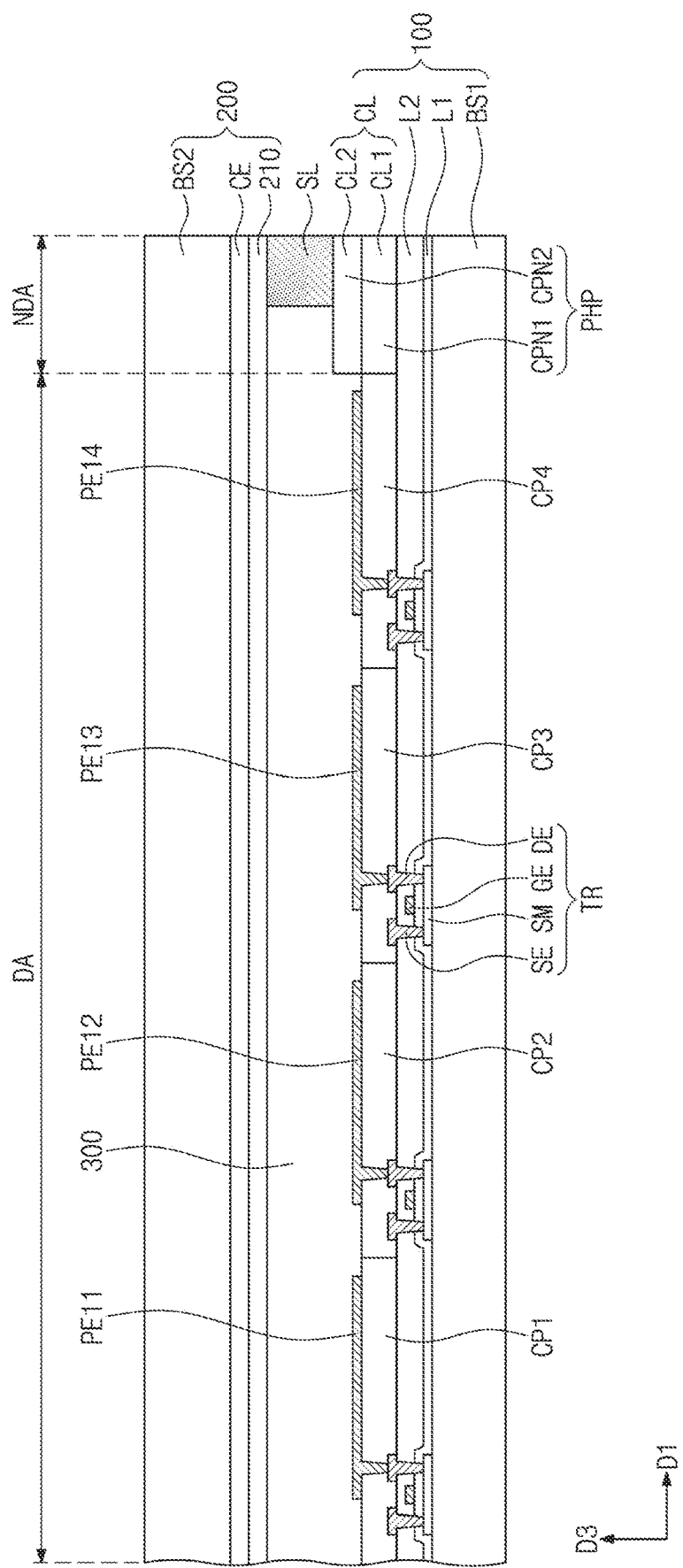
FIG. 2B is a cross-sectional view illustrating a part of FIG. 2A.

FIG. 1A is a block diagram schematically illustrating a display device according to an exemplary embodiment of the inventive concept. FIG. 1B is a perspective view schematically illustrating a display panel according to an exemplary embodiment of the inventive concept. FIG. 2A is a plan view illustrating a part of FIG. 1B, and FIG. 2B is a cross-sectional view illustrating a part of FIG. 2A. Hereinafter, the inventive concept is described with reference to FIGS. 1A to 2B.

As illustrated in FIG. 1A, a display device DS includes a signal control unit TC, a gate driving unit GD, a data driving unit DD, and a display panel DP.

The display panel DP is electrically connected to the gate driving unit GD and the data driving unit DD, and is driven by electrical signals provided from the gate driving unit GD and the data driving unit DD. The display panel DP is not particularly limited, and may be, for example, an organic light emitting display panel, a liquid crystal display panel, a plasma display panel, an electrophoretic display panel, or an electrowetting display panel. An example of the display device DS according to an exemplary embodiment of the inventive concept is a liquid crystal display device including a liquid crystal display panel.

The display device DS may further include a backlight unit (not illustrated) for providing light to the display panel DP, and an optical member including a polarizer. The display panel DP controls transmission of light generated from the backlight unit so as to display an image.

The display panel DP includes a plurality of signal lines GL and DL, and a plurality of pixels PX connected to the signal lines GL and DL. The signal lines GL and DL include a plurality of gate lines GL and a plurality of data lines DL.

The gate lines GL each extend in one direction, and are arranged to be spaced apart in parallel with each other. In this exemplary embodiment, the gate lines GL may extend in a first direction D1, and may be arranged to be spaced apart from each other in a second direction D2. The gate lines GL connect the gate driving unit GD and the pixels PX. The gate lines GL respectively provide the pixels PX with gate signals provided from the gate driving unit GD.

The data lines DL cross the gate lines GL so as to be insulated from the gate lines GL. The data lines DL extend in the second direction D2, and are arranged to be spaced apart from each other in the first direction D1. The data lines DL connect the data driving unit DD and the pixels PX. The data lines DL respectively provide the pixels PX with data signals provided from the data driving unit DD.

The pixels PX may be arranged in the form of matrix in the first direction D1 and the second direction D2. The pixels PX each include a thin film transistor and a liquid crystal capacitor connected thereto. The pixels PX may display an image through the control of quantity of electric charge of the liquid crystal capacitor. A detailed description thereof will be given later.

Each of the pixels PX is connected to a corresponding data line of the data lines DL, and a corresponding gate line of the gate lines GL. In this exemplary embodiment, pixels among the pixels PX arranged in one column may be alternately connected to other data lines for each row. However, this is described by way of example. The display panel DP according to an exemplary embodiment of the inventive concept may have pixel arrangement structures designed in a variety of ways, and the inventive concept is not limited to any one of the disclosed exemplary embodiments.

The signal control unit TC provides electrical signals to the gate driving unit GD and the data driving unit DD so as to control operations of the gate driving unit GD and the data driving unit DD. The signal control unit TC receives input image signals RGB, converts the input image signals RGB so as to conform to an operation of the display panel DP, and outputs image data R'G'B'. Additionally, the signal control unit TC receives various control signals CS, for example, a vertical synchronization signal, a horizontal synchronization signal, a main clock signal, a data enable signal, or the like, and outputs first and second control signals CONT1 and CONT2.

The data driving unit DD receives the first control signal CONT1 and the image data R'G'B'. The data driving unit DD converts the image data R'G'B' into data voltages so as to provide the data voltages to the data lines DL. The first control signal CONT1 includes a horizontal start signal for starting an operation of the data driving unit DD, an inversion signal for inverting a polarity of the data voltages, an output instruction signal for determining when the data voltages are outputted from the data driving unit DD, and the like.

The gate driving unit GD outputs the gate signals to the plurality of gate lines GL in response to the second control signal CONT2. The second control signal CONT2 includes a vertical start signal for starting an operation of the gate driving unit GD, a gate clock signal for determining when a gate voltage is outputted, an output enable signal for determining an on-pulse width of the gate voltage, and the like.

Referring to FIGS. 1B, 2A, and 2B, the display panel DP may include a display surface FS having a display region DA and a surrounding region NDA. The display panel DP displays an image corresponding to a supplied electrical signal on the display region DA. The surrounding region NDA is adjacent to the display region DA. The surrounding region NDA defines the size and shape of the display region DA. In this exemplary embodiment, the surrounding region NDA may have a frame shape surrounding the display region DA.

When viewed in a cross section in FIG. 2B, the display panel DP may include a first substrate 100, a second substrate 200, and a liquid crystal layer 300. The first substrate 100 may include a plurality of pixel regions PA. The pixels PX may be respectively arranged in the pixel regions PA. Each of the pixels PX includes a thin film transistor and a liquid crystal capacitor. The first substrate 100 may include some components of the pixels PX.

For ease of description, first to fourth pixels PX1 to PX4 of the pixels PX are illustrated in FIG. 1B by way of example, and illustrated in FIG. 2A, are three gate lines GL1 to GL3 of the gate lines GL, four data lines DL1 to DL4 of the data lines DL illustrated in FIG. 1A, and a region in which pixel electrodes PE11 to PE34 connected thereto are arranged. The first to fourth pixels PX1 to PX4 may be pixels including pixel electrodes connected to one gate line of the gate lines GL1 to GL3.

Each of the pixel electrodes PE11 to PE34 is connected to a corresponding gate line of the gate lines GL1 to GL3, and a corresponding data line of the data lines DL1 to DL4. The pixel electrodes PE11 to PE34 may have a rectangular shape having a length extending in a direction in which the gate lines GL1 to GL3 extend, and a width extending in a direction in which the data lines DL1 to DL4 extend.

In this exemplary embodiment, a longitudinal direction of the pixel electrodes PE11 to PE34 may cross a direction in which an edge portion PHP defining the surrounding region NDA extends. Accordingly, pixel electrodes connected to a common gate line of the pixel electrodes PE11 to PE34 may be arranged in a direction in which the pixel electrodes approach or get farther away from the edge portion PHP. However, this is illustrated by way of example, and for pixel electrodes according to an exemplary embodiment of the inventive concept, pixel electrodes connected to a common data line may also be arranged to cross a direction in which the edge portion PHP extends. In this case, the first to fourth pixels PX1 to PX4 may be selected to be pixels connected to the common data line. The display device according to an exemplary embodiment of the inventive concept may be designed according to pixel structures having various arrangements, and is not limited to any one embodiment.

The first to fourth pixels PX1 to PX4 illustrated in FIG. 1B may correspond to four pixels connected to one gate line among pixels illustrated in FIG. 2A. For example, the first to fourth pixels PX1 to PX4 may include pixel electrodes connected to one gate line of the gate lines GL1 to GL3, and connected respectively to the data lines DL1 to DL4 different from each other, among the pixel electrodes PE11 to PE34 illustrated in FIG. 2A. For ease of description, a region in which the pixel electrodes PE11 to PE14, among the pixel electrodes PE11 to PE34 illustrated in FIG. 2A, which are connected to the one gate line GL1 and connected respectively to the four data lines DL1 to DL4 are arranged is illustrated in FIG. 2B, for the first to fourth pixels PX1 to PX4 illustrated in FIG. 1B. Hereinafter, the first to fourth pixels PX1 to PX4 are described in more detail with reference to FIGS. 1B to 2B.

The first to fourth pixels PX1 to PX4 may be pixels sequentially arranged in the first direction D1. The fourth pixel PX4 of the first to fourth pixels PX1 to PX4 may be disposed adjacent to the surrounding region NDA, and the first pixel PX1 may be disposed farthest from the surrounding region NDA.

The first to fourth pixels PX1 to PX4 may be pixels corresponding to pixel regions PA in which a thickness deviation of a predetermined value or more is generated when a photoresist pattern (not illustrated) described later is formed. Hereinafter, a pixel structure is described on the basis of the first to fourth pixels PX1 to PX4. However, the number of compared pixels may vary depending on the resolution of the display panel DP, and may increase as the resolution increases.

A first pixel electrode PE11 constitutes the first pixel PX1, a second pixel electrode PE12 constitutes the second pixel PX2, a third pixel electrode PE13 constitutes the third pixel PX3, and a fourth pixel electrode PE14 constitutes the fourth pixel PX4. Each of the first to fourth pixel electrodes PE11 to PE14 is connected to a transistor TR. Each of the first to fourth pixel electrodes PE11 to PE14 may form a liquid crystal capacitor together with a common electrode CE spaced apart with the liquid crystal layer 300 therebetween.

The first substrate 100 may include a first base substrate BS1, thin film transistors TR, a color filter layer CL, and a plurality of insulating layers L1 and L2. A first insulating layer L1 and a second insulating layer L2 are illustrated by way of example for the insulating layers L1 and L2.

The first base substrate BS1 may include an insulating material. The first base substrate BS1 may be optically transparent. Accordingly, light generated from a backlight unit (not illustrated) to be disposed on a lower side of the first base substrate BS1 may pass through the first base substrate BS1 to easily reach the liquid crystal layer 300. For example, the first base substrate BS1 may include a glass substrate or a plastic substrate.

Each of the thin film transistors TR includes a semiconductor pattern SM, a control electrode GE, an input electrode SE, and an output electrode DE. The semiconductor pattern SM is disposed between the first base substrate BS1 and the first insulating layer L1. The semiconductor pattern SM may include a semiconductor material. For example, a semiconductor material may include at least one of amorphous silicon, polycrystalline silicon, single crystal silicon, oxide semiconductor, and compound semiconductor. In addition, the thin film transistors may respectively include semiconductor materials the same or different from each other, and are not limited to any one embodiment.

The control electrode GE may be disposed between the first insulating layer L1 and the second insulating layer L2. The control electrode GE is disposed to be spaced apart from the semiconductor pattern SM with the first insulating layer L1 therebetween. Although not illustrated, the control electrodes GE may be formed to respectively protrude from a corresponding gate line of the gate lines GL toward the pixel electrodes PE11 to PE14. Each of the thin film transistors TR is connected to the control electrode GE to receive a gate signal provided from a corresponding gate line of the gate lines GL.

The input electrode SE and the output electrode DE may be disposed between the second insulating layer L2 and the color filter layer CL. The input electrode SE and the output electrode DE are disposed to be spaced apart from each other. Although not illustrated, the input electrodes SE may be formed to respectively protrude from the data lines DL toward the pixel electrodes PE11 to PE14. Each of the thin film transistors TR is connected to the input electrode SE to receive a data signal provided from a corresponding data line of the data lines DL.

The input electrode SE and the output electrode DE may each penetrate the first insulating layer L1 and the second insulating layer L2 to be connected to the semiconductor pattern SM. The output electrode DE is connected to a corresponding pixel electrode of the pixel electrodes PE11 to PE14, and thus, an electrical signal corresponding to a data signal received from the input electrode SE may be easily transmitted to a corresponding pixel electrode of the pixel electrodes PE11 to PE14.

This arrangement is illustrated by way of example, and the display panel DP according to an exemplary embodiment of the inventive concept may include thin film transistors having various structures. For example, the semiconductor pattern SM may also be disposed on the control electrode GE, and the input electrode SE and the output electrode DE may also be directly connected to the semiconductor pattern SM without separately penetrating the insulating layer. The thin film transistor according to an exemplary embodiment of the inventive concept may have various structures, and is not limited to any one embodiment.

The first to fourth pixel electrodes PE11 to PE14 are disposed in the display region DA. The first to fourth pixel electrodes PE11 to PE14 respectively constitute the first to fourth pixels PX1 to PX4. The first to fourth pixel electrodes PE11 to PE14 form electric fields together with the common electrode CE. Through the liquid crystal capacitors formed by the first to fourth pixel electrodes PE11 to PE14 and the common electrode CE, transmittance of the liquid crystal layer 300 and light displayed by the first to fourth pixels PX1 to PX4 may be controlled to display an image on the display region DA.

Each of the first to fourth pixel electrodes PE11 to PE14 may be formed to be optically transparent. As transparency of the first to fourth pixel electrodes PE11 to PE14 becomes greater, a greater amount of light provided from a backlight unit may easily reach the liquid crystal layer 300. The first to fourth pixel electrodes PE11 to PE14 may include transparent conductive oxide (TCO), carbon nanotube (CNT), or graphene.

In this exemplary embodiment, the color filter layer CL may be disposed in the first substrate 100. The color filter layer CL is disposed between the pixel electrodes PE11 to PE14 and the thin film transistors TR. The color filter layer CL includes a first color layer CL1 and a second color layer CL2. The first color layer CL1 overlaps both the display region DA and the surrounding region NDA.

The first color layer CL1 may include a plurality of color patterns. In this exemplary embodiment, first to fourth color patterns CP1 to CP4 of the color patterns, and a first surrounding color pattern CPN1 are illustrated by way of example.

The first to fourth color patterns CP1 to CP4 are arranged in the display region DA. The first to fourth color patterns CP1 to CP4 may respectively overlap the first to fourth pixel electrodes PE11 to PE14. Light provided from a backlight unit (not illustrated) to be disposed on a lower side of the first substrate 100 may pass through the color filter layer CL to be provided to the liquid crystal layer 300.

The first to fourth pixels PX1 to PX4 may respectively display colors corresponding to the first to fourth color patterns CP1 to CP4. The first to fourth color patterns CP1 to CP4 may have colors the same or different from each other.

The first surrounding color pattern CPN1 is disposed in the surrounding region NDA. The first surrounding color pattern CPN1 has a predetermined color. The first surrounding color pattern CPN1 may have the same or a different color from those of the first to fourth color patterns CP1 to CP4.

The second color layer CL2 is laminated on the first color layer CL1. The second color layer CL2 includes a second surrounding color pattern CPN2. The second surrounding color pattern CPN2 has a predetermined color. The second surrounding color pattern CPN2 may have a color different from that of the first surrounding color pattern CPN1.

The first surrounding color pattern CPN1 and the second surrounding color pattern CPN2 are laminated to define the edge portion PHP. The edge portion PHP may have a color generated by mixing the colors of the first surrounding color pattern CPN1 and the second surrounding color pattern CPN2. The edge portion PHP defines the surrounding region NDA. Accordingly, the surrounding region NDA may be defined by a portion of the first color layer CL1 and a portion of the second color layer CL2.

The first surrounding color pattern CPN1 and the second surrounding color pattern CPN2 may function as a black matrix. The colors of the first surrounding color pattern CPN1 and the second surrounding color pattern CPN2 may be mixed to be black. For example, when the first surrounding color pattern CPN1 has a red color, the second surrounding color pattern CPN2 may have a blue color. The display panel DP according to an exemplary embodiment of the inventive concept may accomplish a light blocking effect for the surrounding region NDA even without formation of a separate black matrix, by including the color filter layer CL. Accordingly, a simplified process may be achieved and the cost of process may be reduced.

Figure 9A:
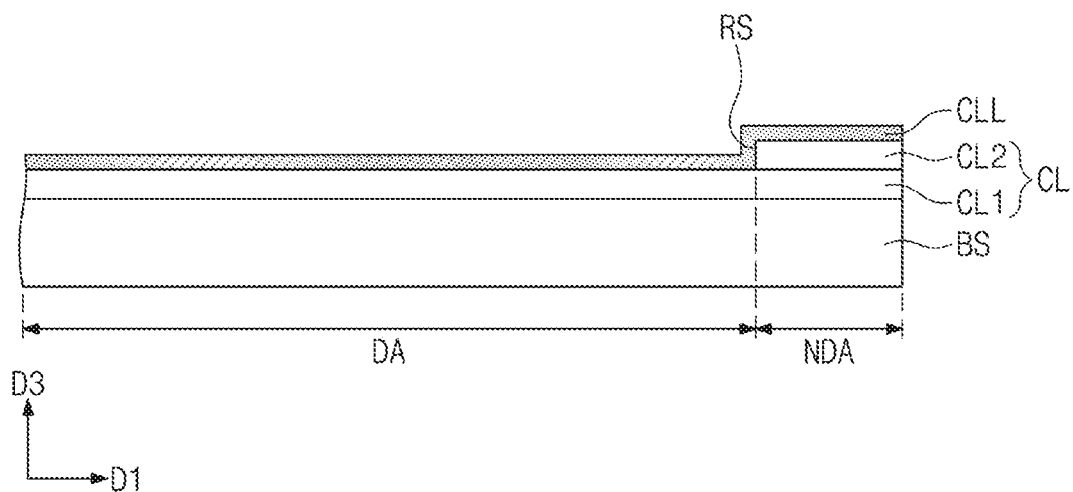
FIG. 9A, FIG. 9B, FIG. 9C, and FIG. 9D are cross-sectional views illustrating a method of manufacturing a display panel according to an exemplary embodiment of the inventive concept.

For the color filter layer CL, a step RS may be formed between the display region DA and the surrounding region NDA, as shown in FIG. 9A. The step RS is defined between the first color layer CL1 and the second color layer CL2, and may substantially correspond to the thickness of the second surrounding color pattern CPN2. Accordingly, an upper surface provided by the color filter layer CL includes the step RS formed between the display region DA and the surrounding region NDA. The fourth pixel electrode PE14 according to an exemplary embodiment of the inventive concept is disposed adjacent to the step RS.

Although not illustrated, an inorganic film may further be included on the color filter layer CL. An upper surface of the color filter layer CL may be coated with the inorganic film so as to prevent moisture or the like generated from the color filter layer CL from permeating the pixel electrodes PE11 to PE14 or the liquid crystal layer 300.

The second substrate 200 is disposed on the first substrate 100. The second substrate 200 may include some components of the pixels PX. In this exemplary embodiment, the second substrate 200 includes a second base substrate BS2 and the common electrode CE.

The second base substrate BS2 is disposed to face the first base substrate BS1. The display surface FS of the display panel DP may be provided on an upper surface of the second base substrate BS2. The second base substrate BS2 may be an optically transparent insulating substrate. The second base substrate BS2 may be formed of the same material as the first base substrate BS1. For example, the first base substrate BS1 may include a glass substrate or a plastic substrate.

The common electrode CE is disposed on the second base substrate BS2. The common electrode CE may have an integral shape overlapping the display region DA entirely. This is, however, illustrated by way of example, and the common electrode CE may also include a plurality of electrode patterns respectively corresponding to the pixel electrodes PE11 to PE14. Each of the pixel electrodes PE11 to PE14 forms a liquid crystal capacitor together with the common electrode CE and the liquid crystal layer 300. As described in detail, the common electrode CE may form an electric field together with the pixel electrodes PE11 to PE14 to control transmittance of the liquid crystal layer 300.

The liquid crystal layer 300 is disposed between the first substrate 100 and the second substrate 200. The liquid crystal layer 300 may include liquid crystal molecules not illustrated. The liquid crystal molecules may include a material whose alignment is controlled by an electric field established in the pixel regions PA.

The display panel DP according to an embodiment of the inventive concept may further include a sealing member SL. The sealing member SL is disposed between the first substrate 100 and the second substrate 200 so as to seal the liquid crystal layer 300. The first substrate 100 and the second substrate 200 may be physically joined by the sealing member SL.

The sealing member SL is disposed in the surrounding region NDA. Accordingly, the sealing member SL may overlap the first surrounding color pattern CPN1 and the second surrounding color pattern CPN2 when viewed in a plane.

Although not illustrated, each of the first substrate 100 and the second substrate 200 may further include an alignment film. The alignment film of the first substrate 100 may be disposed between the pixel electrodes PE11 to PE14 and the liquid crystal layer 300, and the alignment film of the second substrate 200 may be disposed between the common electrode CE and the liquid crystal layer 300. The liquid crystal molecules of the liquid crystal layer 300 may be easily aligned by the alignment film.

FIG. 3 is a plan view schematically illustrating a part of the display panel according to an exemplary embodiment of the inventive concept. In FIG. 3, a region corresponding to one pixel region PA of the first substrate 100 (see FIG. 1B.) is illustrated, and insulating layers are not illustrated for ease of description. A pixel PX illustrated in FIG. 3 may be one of the first to fourth pixels PX1 to PX4 (see FIG. 1B.) illustrated in FIG. 1B. Hereinafter, an exemplary embodiment of the inventive concept is described with reference to FIG. 3. Meanwhile, the same reference numerals are assigned to the same components as those described in FIGS. 1A to 2B, and duplicate descriptions will not be given.

As illustrated in FIG. 3, the pixel region PA may adjoin one gate line GL and one data line DL. A thin film transistor TR and a pixel electrode PE are disposed in the pixel region PA. The pixel electrode PE may correspond to any one of the pixel electrodes PE11 to PE34 (see FIG. 2A.) illustrated in FIG. 2A.

The control electrode GE of the thin film transistor TR branches from the gate line GL toward the pixel electrode PE. The control electrode GE may have an integral shape together with the gate line GL. The input electrode SE of the thin film transistor TR branches from the data line DL toward the pixel electrode PE so as to overlap the control electrode GE. The input electrode SE may have an integral shape together with the data line DL.

One end of the output electrode DE overlaps the control electrode GE. The input electrode SE may have a shape that surrounds the one end of the output electrode DE. The other end of the output electrode DE extends from the one end to overlap a contact hole to which the pixel electrode PE is connected.

The pixel electrode PE may include a vertical portion VP, a horizontal portion HP, and a plurality of branches B1 to B4. The vertical portion VP, the horizontal portion HP, and the branches B1 to B4 are connected to each other to form the pixel electrode PE having an integral shape.

The horizontal portion HP extends in a first direction D1. The horizontal portion HP may extend in a direction parallel to the gate line GL. The vertical portion VP is connected to the horizontal portion HP. The vertical portion VP extends in a second direction D2. The horizontal portion HP may cross and be connected to the vertical portion VP. In this exemplary embodiment, the vertical portion VP and the horizontal portion HP may cross the midpoint of the length of each other.

The branches B1 to B4 are connected to the horizontal portion HP or the vertical portion VP. Each of the branches B1 to B4 may extend in a direction crossing the first direction D1 and the second direction D2. The branches B1 to B4 may extend radially from the horizontal portion HP and the vertical portion VP. The branches B1 to B4 may be divided into first to fourth branches B1 to B4 according to directions in which the branches B1 to B4 extend from the horizontal portion HP or the vertical portion VP. The first to fourth branches B1 to B4 may define a plurality of domains. That is, alignment angles and directions of liquid crystal molecules aligned by the first to fourth branches B1 to B4 may be different from each other.

The first branches B1 extend from the horizontal portion HP or the vertical portion VP in a third direction D3. The first branches B1 may be patterns arranged to be spaced apart from each other in a direction parallel to a fourth direction D4.

The second branches B2 extend from the horizontal portion HP or the vertical portion VP in the fourth direction D4. The second branches B2 may be patterns arranged to be spaced apart from each other in a direction parallel to the third direction D3.

The third branches B3 extend from the horizontal portion HP or the vertical portion VP in a fifth direction D5. The third branches B3 may be patterns arranged to be spaced apart from each other in a direction parallel to the third direction D3. The fifth direction D5 may be a direction opposite to the fourth direction D4.

The fourth branches B4 extend from the horizontal portion HP or the vertical portion VP in a sixth direction D6. The fourth branches B4 may be patterns arranged to be spaced apart from each other in the fourth direction D4. The sixth direction D6 may be a direction opposite to the third direction D3.

In this exemplary embodiment, the first to fourth branches B1 to B4 may have the same width. The first to fourth branches B1 to B4 may be arranged to be spaced apart at predetermined pitches. A pitch may be defined as a distance from one side of a branch to one side of an adjacent branch. The pitch may correspond to a sum of a width of one branch and spacing between adjacent branches.

In this exemplary embodiment, the first to fourth branches B1 to B4 may have the same pitch. That is, the pixel electrode PE includes a plurality of branches B1 to B4 arranged with a uniform pitch.

By including the first to fourth branches B1 to B4 in the pixel electrode PE, a plurality of gradations may be displayed in a single pixel region. Alignment of liquid crystal molecules of the liquid crystal layer 300 (see FIG. 2B.) may be different depending on extension directions of the first to fourth branches B1 to B4. Accordingly, the display panel DP may display various gradations in a single pixel region, thereby enabling a display of an image having improved color reproducibility and implementation of a high resolution display device.

Figure 4:
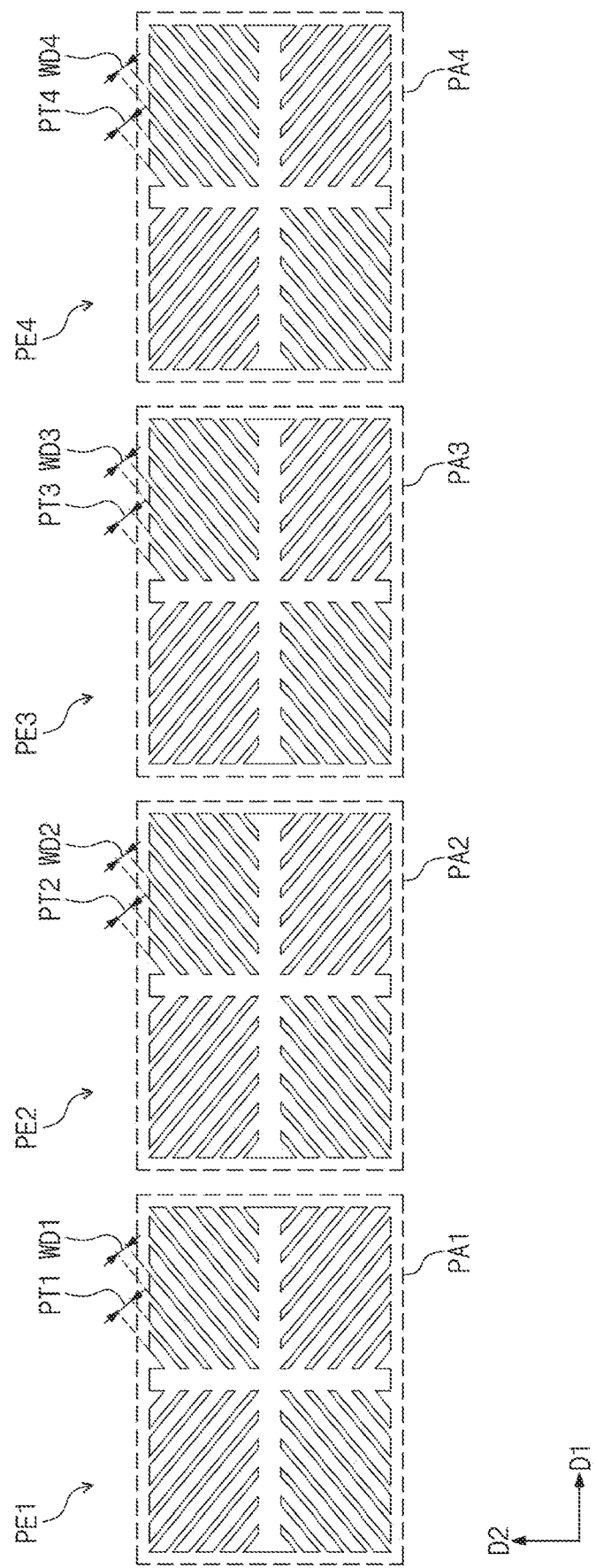
FIG. 4 is a plan view schematically illustrating a part of a configuration of the display panel according to an exemplary embodiment of the inventive concept.

FIG. 4 is a plan view schematically illustrating a part of a configuration of the display panel according to an exemplary embodiment of the inventive concept. Schematically illustrated in FIG. 4 are only first to fourth pixel electrodes PE1 to PE4 respectively disposed in first to fourth pixel regions PA1 to PA4. The first to fourth pixel electrodes PE1 to PE4 may correspond to the first to fourth pixel electrodes PE11 to PE14 (see FIG. 2A.) illustrated in FIGS. 2A and 2B, and are illustrated without data lines, gate lines, and transistors for ease of description.

Referring to FIG. 4, the first to fourth pixel electrodes PE1 to PE4 have shapes corresponding to that of the pixel electrode PE illustrated in FIG. 3. The first pixel electrode PE1 includes a plurality of branches, each of which has a first width WD1 and which are arranged with a first pitch PT1. The second pixel electrode PE2 includes a plurality of branches, each of which has a second width WD2 and which are arranged with a second pitch PT2. The third pixel electrode PE3 includes a plurality of branches, each of which has a third width WD3 and which are arranged with a third pitch PT3. The fourth pixel electrode PE4 includes a plurality of branches, each of which has a fourth width WD4 and which are arranged with a fourth pitch PT4.

In this exemplary embodiment, the first to fourth pitches PT1 to PT4 may have the same value. Additionally, the first to fourth widths WD1 to WD4 may have the same value. Accordingly, the first to fourth pixel electrodes PE1 to PE4 may have substantially the same shape.

When the first to fourth pixel regions PA1 to PA4 have the same area, areas occupied by the first to fourth pixel electrodes PE1 to PE4 may be substantially the same. An area occupied by the pixel electrode in the pixel region influences alignment of the liquid crystal layer 300 (see FIG. 1B.).

As described in detail, the first pixel region PA1 of the first to fourth pixel regions PA1 to PA4 corresponds to a region farthest from the surrounding region NDA (see FIG. 1B.), and the fourth pixel region PA4 corresponds to a region closest to the surrounding region NDA. According to an exemplary embodiment of the inventive concept, by equally designing areas of the first to fourth pixel electrodes PE1 to PE4 respectively occupying the first to fourth pixel regions PA1 to PA4, the same alignment of the liquid crystal layer may be induced even in a region adjacent to the surrounding region NDA. Accordingly, a uniform luminance distribution may be implemented in the entire display region DA (see FIG. 1B.).

Figure 5:
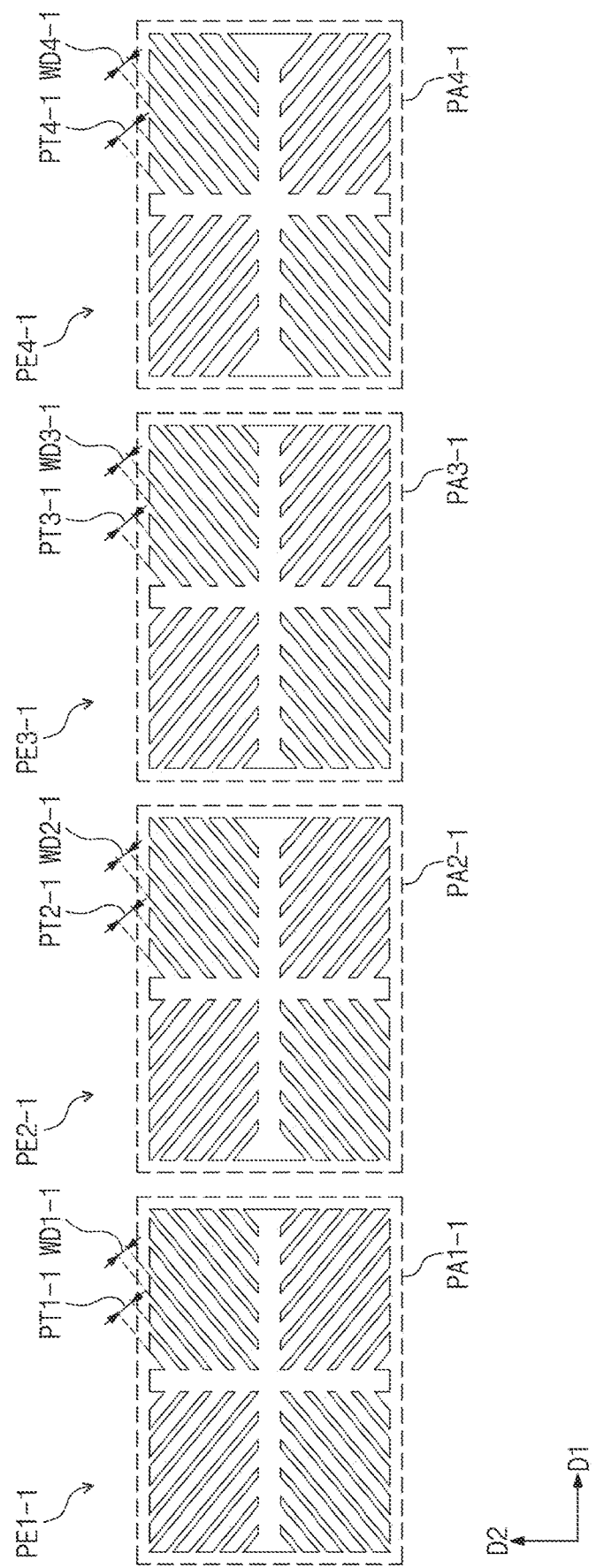
FIG. 5 is a plan view schematically illustrating a part of a configuration of a display panel according to an exemplary embodiment of the inventive concept.

FIG. 5 is a plan view schematically illustrating a part of a configuration of a display panel according to an exemplary embodiment of the inventive concept. Schematically illustrated in FIG. 5 are only first to fourth pixel electrodes PE1-1 to PE4-1 respectively disposed in first to fourth pixel regions PA1-1 to PA4-1. The first to fourth pixel electrodes PE1-1 to PE4-1 may correspond to the first to fourth pixel electrodes PE11 to PE14 (see FIG. 2A.) illustrated in FIGS. 2A and 2B, and are illustrated without data lines, gate lines, and transistors for ease of description. Hereinafter, an exemplary embodiment of the inventive concept is described with reference to FIG. 5. Meanwhile, the same reference numerals are assigned to the same components as those described in FIGS. 1A to 4, and duplicate descriptions will not be given.

Referring to FIG. 5, the first to fourth pixel electrodes PE1-1 to PE4-1 have shapes corresponding to that of the pixel electrode PE illustrated in FIG. 3. However, the first to fourth pixel electrodes PE1-1 to PE4-1 may have pitches and widths different from each other.

Specifically, the first pixel electrode PE1-1 includes a plurality of branches, each of which has a first width WD1-1 and which are arranged with a first pitch PT1-1. The second pixel electrode PE2-1 includes a plurality of branches, each of which has a second width WD2-1 and which are arranged with a second pitch PT2-1. The third pixel electrode PE3-1 includes a plurality of branches, each of which has a third width WD3-1 and which are arranged with a third pitch PT3-1. The fourth pixel electrode PE4-1 includes a plurality of branches, each of which has a fourth width WD4-1 and which are arranged with a fourth pitch PT4-1.

In this exemplary embodiment, the first to fourth widths WD1-1 to WD4-1 have values different from each other. The first width WD1-1, among the first to fourth widths WD1-1 to WD4-1, of the branches of the first pixel electrode PE1-1 farthest from the surrounding region NDA (see FIG. 1B.) may be the smallest, and the fourth width WD4-1 of the branches of the fourth pixel electrode PE4-1 closest to the surrounding region NDA may be the largest. That is, the first to fourth widths WD1-1 to WD4-1 may be larger as a corresponding pixel electrode of the first to fourth pixel electrodes PE1-1 to PE4-1 is closer to the surrounding region NDA.

In this exemplary embodiment, the first to fourth pitches PT1-1 to PT4-1 have values different from each other. The first pitch PT1-1, among the first to fourth pitches PT1-1 to PT4-1, of the first pixel electrode PE1-1 farthest from the surrounding region NDA may be the smallest, and the fourth pitch PT4-1 of the fourth pixel electrode PE4-1 closest to the surrounding region NDA may be the largest. That is, the first to fourth pitches PT1-1 to PT4-1 may be larger as a corresponding pixel electrode of the first to fourth pixel electrodes PE1-1 to PE4-1 is closer to the surrounding region NDA.

The first pixel electrode PE1-1 is constituted of the branches having the first width WD1-1 smallest among the widths for the first to fourth pixel electrodes PE1-1 to PE4-1, but has the smallest first pitch PT1-1. Thus, the first pixel electrode PE1-1 may include more branches in the same area.

On the contrary, the fourth pixel electrode PE4-1 is constituted of the branches having the fourth width WD4-1 largest among the widths for the first to fourth pixel electrodes PE1-1 to PE4-1, but has the largest fourth pitch PT4-1. Thus, the fourth pixel electrode PE4-1 includes fewer branches in the same area.

When the first to fourth pixel regions PA1 to PA4 have the same area, areas occupied by the first to fourth pixel electrodes PE1 to PE4 may be substantially the same. As described in detail, an area occupied by the pixel electrode in the pixel region influences alignment of the liquid crystal layer 300 (see FIG. 1B.). According to an exemplary embodiment of the inventive concept, areas occupied in the same pixel region by the pixel electrodes PE1-1 to PE4-1 constituted of the branches having widths different from each other may be controlled as desired through pitch adjustment.

By designing equal areas of the first to fourth pixel electrodes PE1-1 to PE4-1 respectively occupying the first to fourth pixel regions PA1-1 to PA4-1, the same alignment of the liquid crystal layer may be induced even in a region adjacent to the surrounding region NDA. Accordingly, a uniform luminance distribution may be implemented in the entire display region DA (see FIG. 1B.).

Figure 6:
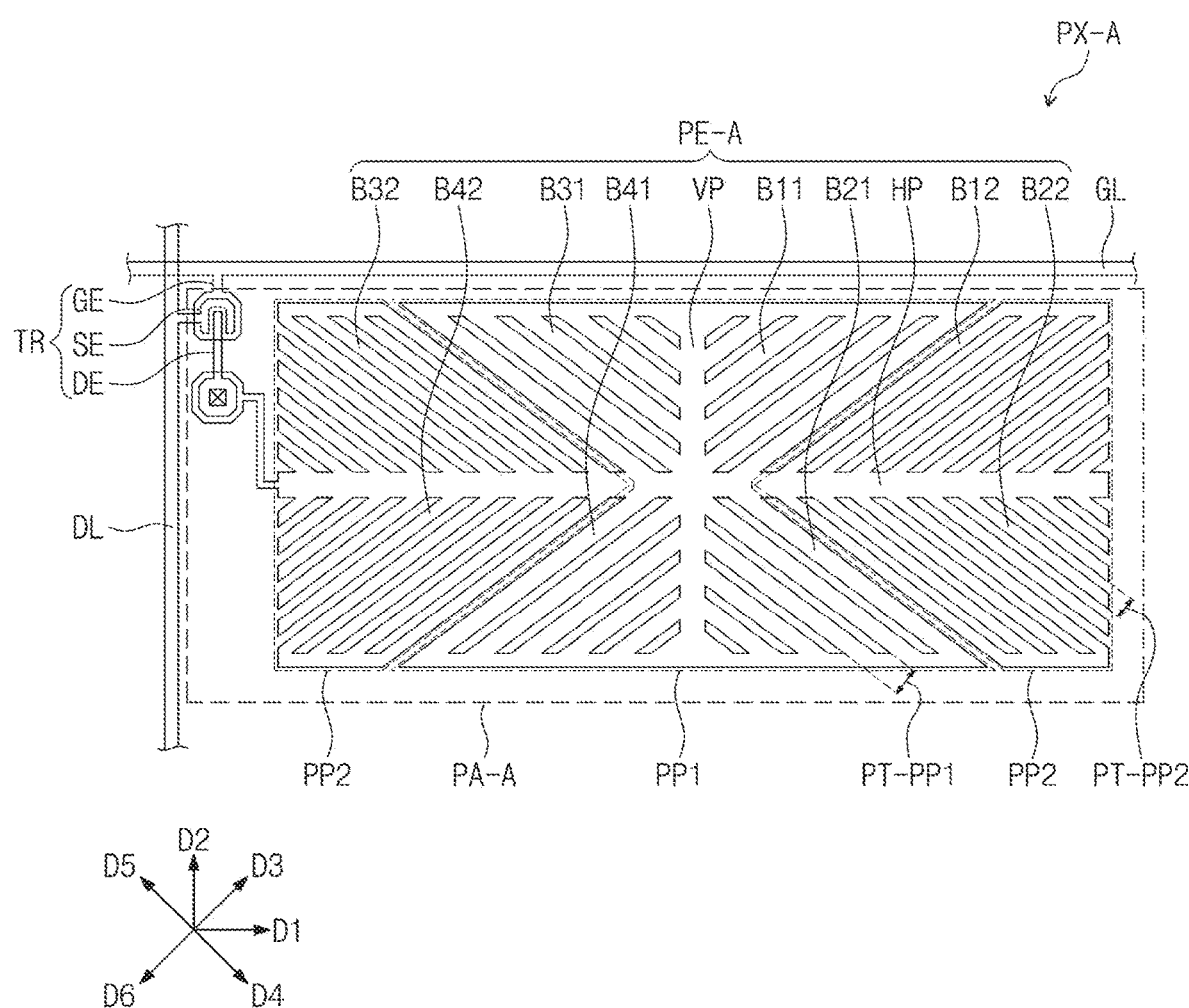
FIG. 6 is a plan view schematically illustrating a part of a display panel according to an exemplary embodiment of the inventive concept.
Figure 7:
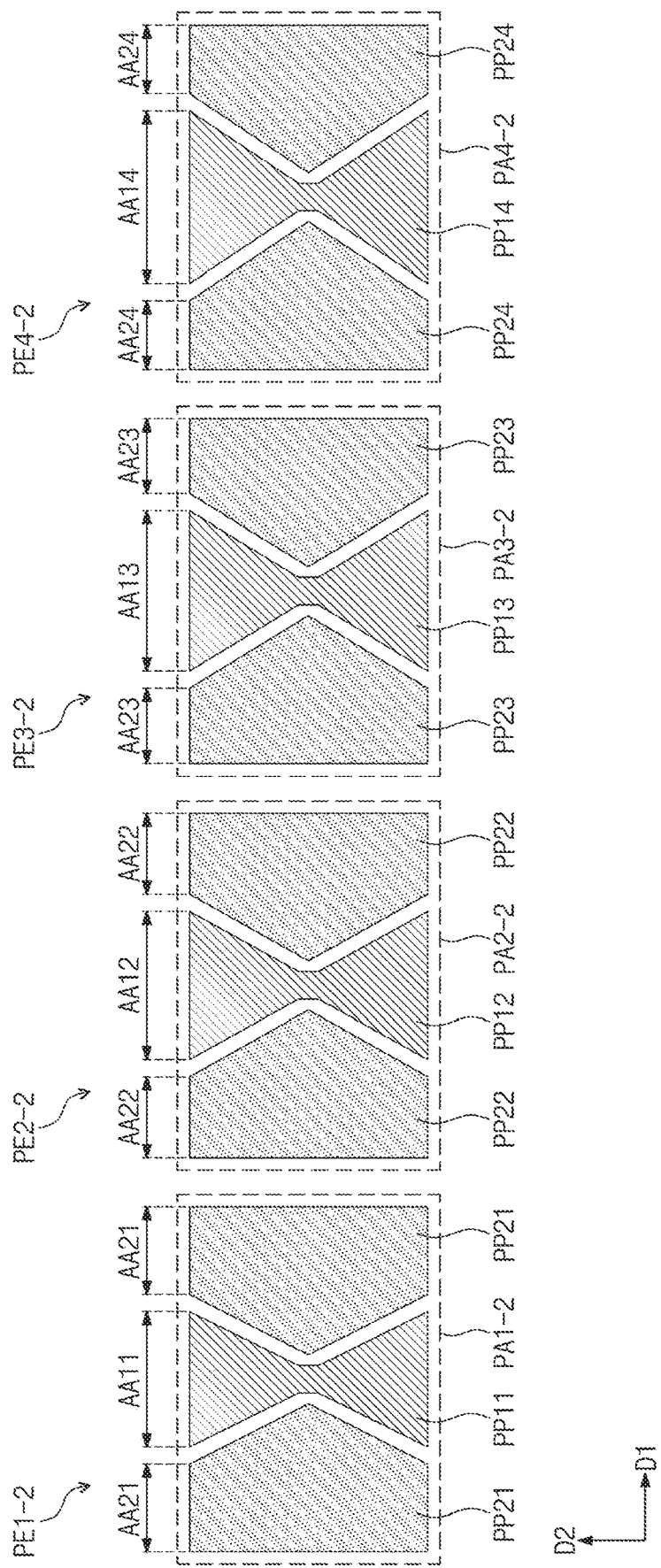
FIG. 7 is a plan view schematically illustrating a part of a configuration of a display panel according to an exemplary embodiment of the inventive concept.

FIG. 6 is a plan view schematically illustrating a part of a display panel according to an exemplary embodiment of the inventive concept. FIG. 7 is a plan view schematically illustrating a part of a configuration of a display panel according to an exemplary embodiment of the inventive concept. In FIG. 6, a region corresponding to one pixel region PA-A of the first substrate 100 (see FIG. 1B.) is illustrated, and insulating layers are not illustrated for ease of description. Schematically illustrated in FIG. 7 are only first to fourth pixel electrodes PE1-2 to PE4-2 respectively disposed in first to fourth pixel regions PA1-2 to PA4-2. The first to fourth pixel electrodes PE1-2 to PE4-2 may correspond to the first to fourth pixel electrodes PE11 to PE14 (see FIG. 2A.) illustrated in FIGS. 2A and 2B, and are illustrated without data lines, gate lines, and transistors for ease of description. Hereinafter, an exemplary embodiment of the inventive concept is described with reference to FIGS. 6 and 7. In the meantime, the same reference numerals are assigned to the same components as those described in FIGS. 1A to 5, and duplicate descriptions will not be given.

As illustrated in FIG. 6, the pixel region PA-A may adjoin one gate line GL and one data line DL. A thin film transistor TR and a pixel electrode PE-A are disposed in the pixel region PA-A. The thin film transistor TR has a configuration corresponding to that of the thin film transistor TR illustrated in FIG. 3. Hereinafter, duplicate descriptions will not be given.

The pixel electrode PE-A may include a vertical portion VP, a horizontal portion HP, and a plurality of branches B11, B12, B21, B22, B31, B32, B41, and B42. The vertical portion VP, the horizontal portion HP, and the branches B11, B12, B21, B22, B31, B32, B41, and B42 are connected to each other to form the pixel electrode PE-A having an integral shape.

The horizontal portion HP extends in a first direction D1, and the vertical portion VP extends in a second direction D2. The horizontal portion HP and the vertical portion VP may be connected crossing each other. In this exemplary embodiment, the vertical portion VP and the horizontal portion HP may cross the midpoint of the length of each other.

The branches B11, B12, B21, B22, B31, B32, B41, and B42 are connected to the horizontal portion HP or the vertical portion VP. The branches B11, B12, B21, B22, B31, B32, B41, and B42 may extend radially from the horizontal portion HP and the vertical portion VP.

In this exemplary embodiment, the branches B11, B12, B21, B22, B31, B32, B41, and B42 may have the same width. The branches B11, B12, B21, B22, B31, B32, B41, and B42 may be arranged to be spaced apart at predetermined pitches. The branches B11, B12, B21, B22, B31, B32, B41, and B42 may be divided into first to eighth branches B11, B12, B21, B22, B31, B32, B41, and B42 according to directions in which the branches B11, B12, B21, B22, B31, B32, B41, and B42 extend from the horizontal portion HP or the vertical portion VP, and pitches by which the branches B11, B12, B21, B22, B31, B32, B41, and B42 are spaced apart.

The first branches B11 and the second branches B12 extend from the horizontal portion HP or the vertical portion VP in a third direction D3. The first branches B11 and the second branches B12 may be patterns arranged to be spaced apart from each other in a direction parallel to a fourth direction D4.

The first branches B11 and the second branches B12 have pitches different from each other. The first branches B11 have a first pitch PT-PP1. The second branches B12 have a second pitch PT-PP2. In a direction parallel to the fourth direction D4, the first branches B11 may be arranged with the first pitch PT-PP1, and the second branches B12 may be arranged with the second pitch PT-PP2.

The third branches B21 and the fourth branches B22 extend from the horizontal portion HP or the vertical portion VP in the fourth direction D4. The third branches B21 and the fourth branches B22 may be patterns arranged to be spaced apart from each other in a direction parallel to the third direction D3.

The third branches B21 and the fourth branches B22 have pitches different from each other. The third branches B21 have the first pitch PT-PP1. The fourth branches B22 have the second pitch PT-PP2. In a direction parallel to the third direction D3, the third branches B21 may be arranged with the first pitch PT-PP1, and the fourth branches B22 may be arranged with the second pitch PT-PP2.

The fifth branches B31 and the sixth branches B32 extend from the horizontal portion HP or the vertical portion VP in a fifth direction D5. The fifth branches B31 and the sixth branches B32 may be patterns arranged to be spaced apart from each other in a direction parallel to the third direction D3.

The fifth branches B31 and the sixth branches B32 have pitches different from each other. The fifth branches B31 have the first pitch PT-PP1. The sixth branches B32 have the second pitch PT-PP2. In a direction parallel to the third direction D3, the fifth branches B31 may be arranged with the first pitch PT-PP1, and the sixth branches B32 may be arranged with the second pitch PT-PP2.

The seventh branches B41 and the eighth branches B42 extend from the horizontal portion HP or the vertical portion VP in a sixth direction D6. The seventh branches B41 and the eighth branches B42 may be patterns arranged to be spaced apart from each other in a direction parallel to the fourth direction D4.

The seventh branches B41 and the eighth branches B42 have pitches different from each other. The seventh branches B41 have the first pitch PT-PP1. The eighth branches B42 have the second pitch PT-PP2. In a direction parallel to the fourth direction D4, the seventh branches B41 may be arranged with the first pitch PT-PP1, and the eighth branches B42 may be arranged with the second pitch PT-PP2.

In the meantime, in this exemplary embodiment, ends defining horizontal sides of the pixel electrode PE-A among the branches B11, B12, B21, B22, B31, B32, B41, and B42 may be connected to each other depending on the pitch. The horizontal sides of the pixel electrode PE-A are sides parallel to the horizontal portion HP, and include a side adjacent to the gate line GL and a side facing the same. For example, ends of the first branches B11 and ends of the fifth branches B31 among the branches B11, B12, B21, B22, B31, B32, B41, and B42 may be connected to each other by a bar extending in parallel with the horizontal portion HP. Likewise, ends of the third branches B21 and ends of the seventh branches B41 among the branches B11, B12, B21, B22, B31, B32, B41, and B42 may be connected to each other by a bar extending in parallel with the horizontal portion HP.

In addition, ends of some of the second branches B12 defining the horizontal sides of the pixel electrode PE-A, some of the fourth branches B22 defining the horizontal sides of the pixel electrode PE-A, some of the sixth branches B32 defining the horizontal sides of the pixel electrode PE-A, and some of the eighth branches B42 defining the horizontal sides of the pixel electrode PE-A may be connected to each other by a bar extending in parallel with the horizontal portion HP.

According to an exemplary embodiment of the inventive concept, by connecting the branches together using the bar extending in parallel with the horizontal portion HP on the horizontal sides of the pixel electrode PE-A, poor alignment of liquid crystal or light leakage phenomenon caused by the gate line GL disposed adjacent to the horizontal sides of the pixel electrode PE-A may be prevented, and liquid crystal alignment may be induced to be stably achieved in the corresponding pixel region PA-A. However, this is illustrated by way of example, and the pixel electrode PE-A according to an exemplary embodiment of the inventive concept may have various shapes, and is not limited to any one embodiment.

Meanwhile, in this exemplary embodiment, the pixel electrode PE-A may be divided into a first pitch group PP1 and a second pitch group PP2 depending on the pitch. The first pitch group PP1 includes the first branches B11 and the fifth branches B31 connected by the bar, and the third branches B21 and the seventh branches B41 connected by the bar. The first pitch group PP1 may be patterns having the first pitch PT-PP1.

The second pitch group PP2 includes the second branches B12, the fourth branches B22, the sixth branches B32, and the eighth branches B42. The second pitch group PP2 may be patterns having the second pitch PT-PP2. The second pitch group PP2 may include two parts spaced apart from each other in the first direction D1 with the first pitch group PP1 therebetween. Accordingly, in the first direction D1, the first pitch group PP1 is disposed at the center of the pixel region PA-A, and the second pitch group PP2 is disposed at outer portions of the pixel region PA-A.

In this exemplary embodiment, the first pitch PT-PP1 may be greater than the second pitch PT-PP2. By disposing branches having a smaller pitch at a relatively outer portion of the pixel region PA-A in the first direction D1, the pixel electrode PE-A according to an exemplary embodiment of the inventive concept may reduce the occurrence of light leakage phenomenon or the like at outer portions of the pixel region PA-A at low gradations, and improve side visibility. However, this is illustrated by way of example. The first pitch PT-PP1 may also be less than the second pitch PT-PP2, and is not limited to any one embodiment.

For ease of description, schematically illustrated in FIG. 7 are only shapes corresponding to the first pitch group PP1 (see FIG. 6.) and the second pitch group PP2 (see FIG. 6.) illustrated in FIG. 6. As illustrated in FIG. 7, area ratios of first pitch groups PP11 to PP14 and second pitch groups PP21 to PP24 respectively constituting first to fourth pixel electrodes PE1-2 to PE4-2 may be different from each other.

Specifically, the first pixel electrode PE1-2 includes the first pitch group PP11 having a first area AA11, and the two second pitch groups PP21 each having a second area AA21. The area ratio of the two second pitch groups PP21 to the first pitch group PP11 in a first pixel region PA1-2 may be twice the ratio of the second area AA21 to the first area AA11.

The second pixel electrode PE2-2 includes the first pitch group PP12 having a first area AA12, and the two second pitch groups PP22 each having a second area AA22. The area ratio of the two second pitch groups PP22 to the first pitch group PP12 in a second pixel region PA2-2 may be twice the ratio of the second area AA22 to the first area AA12.

The third pixel electrode PE3-2 includes the first pitch group PP13 having a first area AA13, and the two second pitch groups PP23 each having a second area AA23. The area ratio of the two second pitch groups PP23 to the first pitch group PP13 in a third pixel region PA3-2 may be twice the ratio of the second area AA23 to the first area AA13.

The fourth pixel electrode PE4-2 includes the first pitch group PP14 having a first area AA14, and the two second pitch groups PP24 each having a second area AA24. The area ratio of the two second pitch groups PP24 to the first pitch group PP14 in a fourth pixel region PA4-2 may be twice the ratio of the second area AA24 to the first area AA14.

For the first to fourth pixel regions PA1-2 to PA4-2 of this exemplary embodiment, area ratios of the first pitch group to the second pitch group have values different from each other. When the first pitch group includes branches having a pitch larger than that of the branches of the second pitch group, an area ratio of the second pitch group PP21 to the first pitch group PP11 in the first pixel region PA1-2 may be less than that of the second pitch group PP24 to the first pitch group PP14 in the fourth pixel region PA4-2. As illustrated in FIG. 7, when the first to fourth pixel regions PA1-2 to PA4-2 have the same area, areas AA11, AA12, AA13, and AA14 of the first pitch groups may decrease along the first direction D1, and areas AA21, AA22, AA23, and AA24 of the second pitch groups may increase along the first direction D1.

A ratio of the area of the branches having a greater pitch to the area of the branches having a smaller pitch increases as a corresponding pixel region is closer to the surrounding region NDA. For example, when an area ratio of the second pitch group PP21 to the first pitch group PP11 is 1:1 in the first pixel region PA1-2, an area ratio of the second pitch group PP22 to the first pitch group PP12 may be 1:1.1 in the second pixel region PA2-2, an area ratio of the second pitch group PP23 to the first pitch group PP13 may be 1:1.2 in the third pixel region PA3-2, and an area ratio of the second pitch group PP24 to the first pitch group PP14 may be 1:1.3 in the fourth pixel region PA4-2.

In other words, according to this exemplary embodiment, shapes of the pixel electrodes PE1-2 to PE1-4 may be designed such that an area occupied by branches having a relatively large pitch in the pixel region of the same area increases as the pixel region is closer to the surrounding region NDA. Accordingly, a substantial area occupied by the pixel electrode in the pixel region decreases as the pixel region is closer to the surrounding region NDA.

According to an exemplary embodiment of the inventive concept, by adjusting the area ratios, areas in the same pixel region occupied by the pixel electrodes PE1-2 to PE4-2 constituted of branches having pitches different from each other may be controlled as desired.

By designing the areas of the first to fourth pixel electrodes PE1-2 to PE4-2 respectively occupying the first to fourth pixel regions PA1-2 to PA4-2 to be smaller as a corresponding pixel electrode is closer to the surrounding region NDA, light leakage or the like may be prevented from being viewed from the outside even though the light leakage or the like is generated in the surrounding region NDA at low gradations. Accordingly, a display panel having improved visibility may be provided.

Figure 8A:
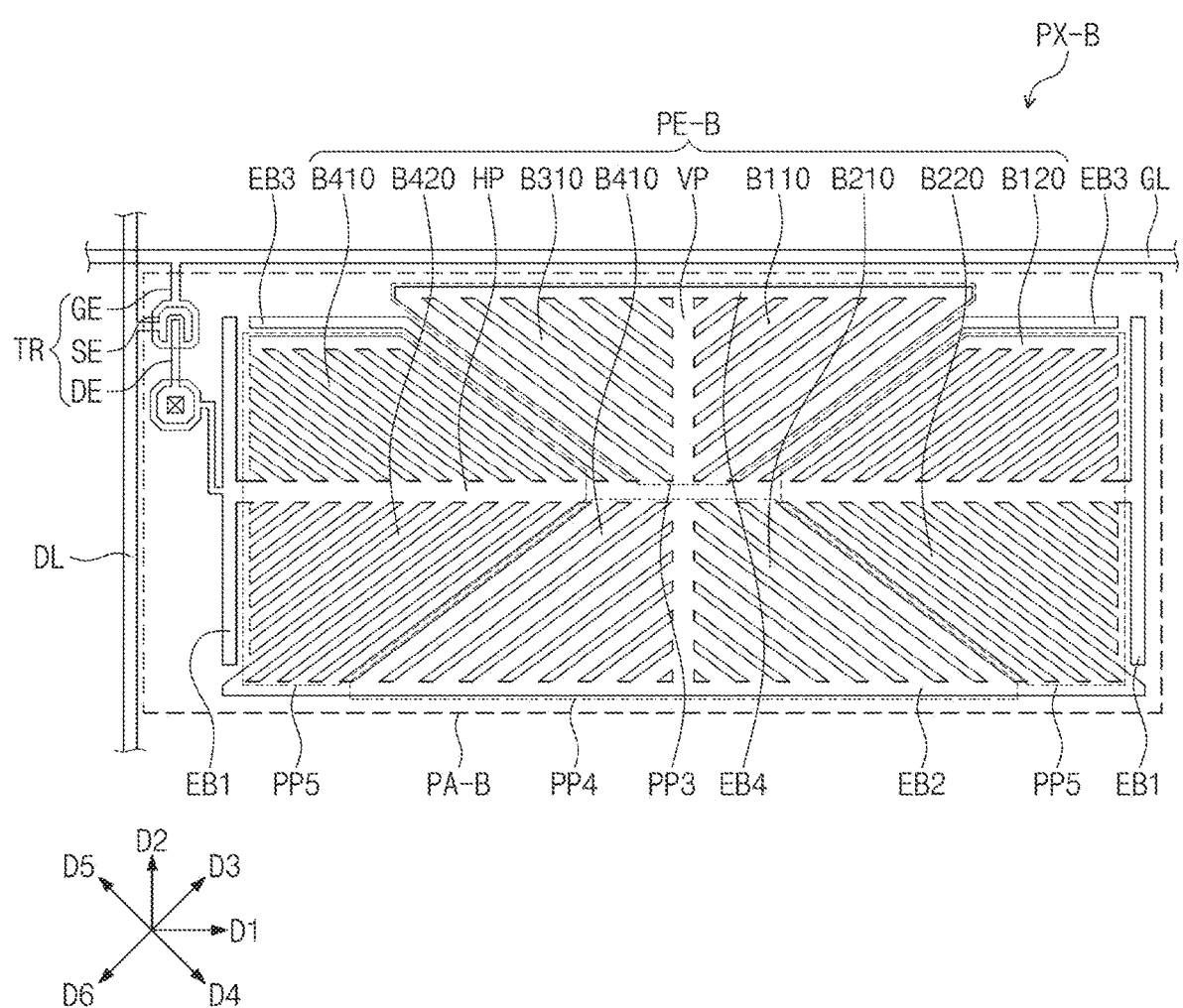
FIG. 8A is a plan view schematically illustrating a part of a display panel according to an exemplary embodiment of the inventive concept.
Figure 8B:
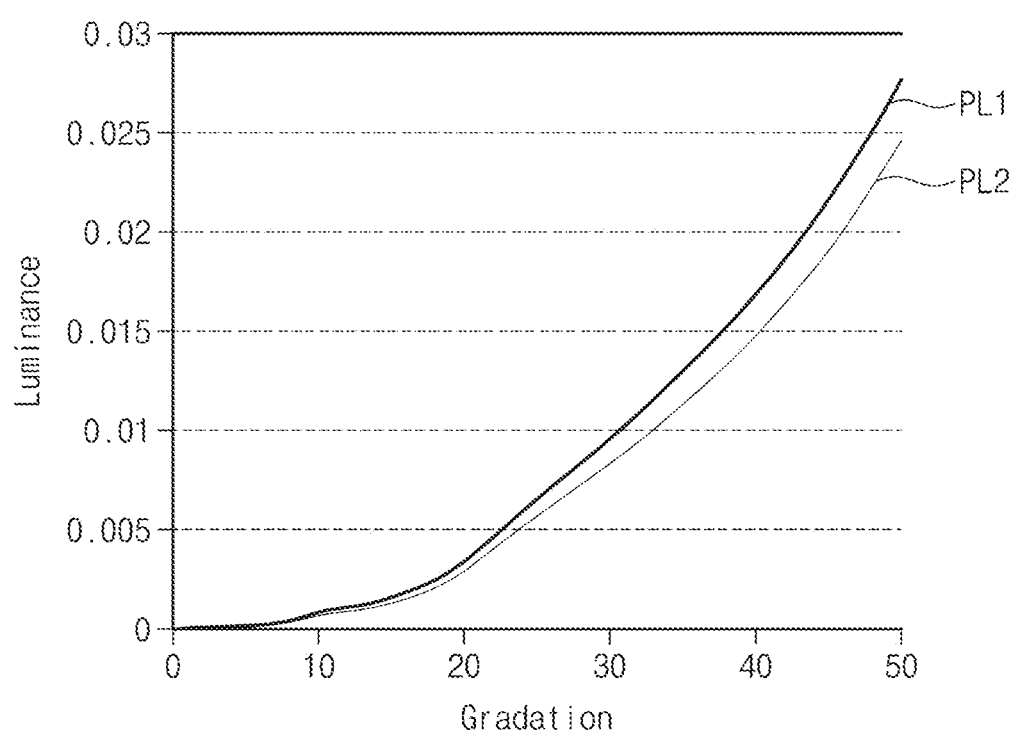
FIG. 8B is a graph showing luminance in a low gradation range of a pixel electrode illustrated in FIG. 8A.

FIG. 8A is a plan view schematically illustrating a part of a display panel according to an exemplary embodiment of the inventive concept. FIG. 8B is a graph showing luminance in a low gradation range of a pixel electrode illustrated in FIG. 8A. In FIG. 8A, a region corresponding to one pixel region PA-B of the first substrate 100 (see FIG. 1B.) is illustrated, and insulating layers are not illustrated for ease of description. Hereinafter, an exemplary embodiment of the inventive concept is described with reference to FIGS. 8A and 8B.

As illustrated in FIG. 8A, the pixel region PA-B may be adjacent to one gate line GL and one data line DL. A thin film transistor TR and a pixel electrode PE-B are disposed in the pixel region PA-B. The thin film transistor TR has a configuration corresponding to that of the thin film transistor TR illustrated in FIG. 3. Hereinafter, duplicate descriptions will not be given.

The pixel electrode PE-B may include a vertical portion VP, a horizontal portion HP, and a plurality of branches B110, B120, B210, B220, B310, B320, B410, and B420. The vertical portion VP, the horizontal portion HP, and the branches B110, B120, B210, B220, B310, B320, B410, and B420 are connected to each other to form the pixel electrode PE-B having an integral shape.

The horizontal portion HP extends in a first direction D1, and the vertical portion VP extends in a second direction D2. The horizontal portion HP and the vertical portion VP may be connected crossing each other. In this exemplary embodiment, the vertical portion VP and the horizontal portion HP may cross the midpoint of the length of each other.

The branches B110, B120, B210, B220, B310, B320, B410, and B420 are connected to the horizontal portion HP or the vertical portion VP. The branches B110, B120, B210, B220, B310, B320, B410, and B420 may extend radially from the horizontal portion HP and the vertical portion VP. The branches B110, B120, B210, B220, B310, B320, B410, and B420 include first to eighth branches B110, B120, B210, B220, B310, B320, B410, and B420.

In this exemplary embodiment, the first to eighth branches B110, B120, B210, B220, B310, B320, B410, and B420 may be arranged to be spaced apart from each other with predetermined pitches. The pixel electrode PE-B may be divided into a first pitch group PP3 having a first pitch, a second pitch group PP4 having a second pitch, and a third pitch group PP5 having a third pitch. In other words, the pixel electrode PE-B includes three groups of branches having pitches different from each other.

The first branches B110 and the second branches B120 extend from the horizontal portion HP or the vertical portion VP in a third direction D3. The first branches B110 and the second branches B120 may be patterns arranged to be spaced apart from each other in a direction parallel to a fourth direction D4.

The first branches B110 and the second branches B120 have pitches different from each other. The first branches B110 have the first pitch. The second branches B120 have the third pitch. In a direction parallel to the fourth direction D4, the first branches B110 may be arranged with the first pitch, and the second branches B120 may be arranged with the third pitch.

The third branches B210 and the fourth branches B220 extend from the horizontal portion HP or the vertical portion VP in the fourth direction D4. The third branches B210 and the fourth branches B220 may be patterns arranged to be spaced apart from each other in a direction parallel to the third direction D3.

The third branches B210 and the fourth branches B220 have pitches different from each other. The third branches B210 have the third pitch. The fourth branches B220 have the second pitch. In a direction parallel to the third direction D3, the third branches B210 may be arranged with the third pitch, and the fourth branches B220 may be arranged with the second pitch.

The fifth branches B310 and the sixth branches B320 extend from the horizontal portion HP or the vertical portion VP in a fifth direction D5. The fifth branches B310 and the sixth branches B320 may be patterns arranged to be spaced apart from each other in a direction parallel to the third direction D3.

The fifth branches B310 and the sixth branches B320 have pitches different from each other. The fifth branches B310 have the first pitch. The sixth branches B320 have the third pitch. In a direction parallel to the third direction D3, the fifth branches B310 may be arranged with the first pitch, and the sixth branches B320 may be arranged with the third pitch.

The seventh branches B410 and the eighth branches B420 extend from the horizontal portion HP or the vertical portion VP in a sixth direction D6. The seventh branches B410 and the eighth branches B420 may be patterns arranged to be spaced apart from each other in a direction parallel to the fourth direction D4.

The seventh branches B410 and the eighth branches B420 have pitches different from each other. The seventh branches B410 have the second pitch. The eighth branches B420 have the third pitch. In a direction parallel to the fourth direction D4, the seventh branches B410 may be arranged with the second pitch, and the eighth branches B420 may be arranged with the third pitch.

In the meantime, the pixel electrode PE-B according to an embodiment of the inventive concept may further include a plurality of edge patterns EB1 to EB4. The edge patterns EB1 to EB4 may be connected to the horizontal portion HP, the vertical portion VP, or the first to eighth branches B110, B120, B210, B220, B310, B320, B410, and B420 so as to form a pixel electrode PE-B of an integral shape. The edge patterns EB1 to EB4 include first to fourth edge patterns EB1 to EB4.

The first edge pattern EB1 has a linear shape extending in the second direction D2. The first edge pattern EB1 may be provided in plurality, and be disposed to be connected to both ends of the horizontal portion HP. The first edge pattern EB1 may be disposed adjacent to ends of the branches B120, B220, B320, and B420 belonging to the third pitch group PP5.

The second edge pattern EB2 has a linear shape extending in the first direction D1. The second edge pattern EB2 may extend in a direction crossing the first edge pattern EB1. The second edge pattern EB2 may be connected to the vertical portion VP, the branches B210 and B410 belonging to the second pitch group PP4, and some branches B220 and B420 among the branches B120, B220, B320, and B420 belonging to the third pitch group PP5. Specifically, the second edge pattern EB2 connects a lower end of the vertical portion VP, ends of the third branches B210, ends of the fourth branches B220, ends of the seventh branches B410, and ends of the eighth branches B420.

The third edge pattern EB3 has a linear shape that extends in the first direction D1 but includes a bent portion. The third edge pattern EB3 is disposed between two branches of the branches. The third edge pattern EB3 includes a portion that extends from the horizontal portion HP and extends in parallel with the adjacent branches, and a portion that is connected thereto and extends in the first direction D1. The third edge pattern EB3 may be provided in plurality to be disposed between the first pitch group PP3 and the third pitch group PP5. The third edge pattern EB3 may function as a boundary to separate the first pitch group PP3 from the third pitch group PP5.

The fourth edge pattern EB4 has a linear shape extending in the first direction D1. The fourth edge pattern EB4 is connected to the first pitch group PP3. Specifically, the fourth edge pattern EB4 connects an upper end of the vertical portion VP, ends of the first branches B110, and ends of the fifth branches B310.

According to an exemplary embodiment of the inventive concept, by further including the plurality of edge patterns EB1 to EB4, division of the plurality of pitch groups PP3, PP4, and PP5 having pitches different from each other may be more easily implemented for the pixel electrode PE-B.

Illustrated together in FIG. 8B are a luminance plot PL1 of the pixel electrode PE-A illustrated in FIG. 6 in a low gradation range, and a luminance plot PL2 of the pixel electrode PE-B illustrated in FIG. 8A in a low gradation range. Referring to FIG. 8B, it is seen that luminance of the pixel electrode PE-B illustrated in FIG. 8A is lower in a gradation range of 0 to 50 corresponding to the low gradation range. Accordingly, by including branches having finer pitches in the pixel electrode PE-B than pitches for the pixel electrode PE-A illustrated in FIG. 6, a pixel region having lower luminance at low gradations may be designed.

According to an exemplary embodiment of the inventive concept, just by disposing the pixel electrode PE-A illustrated in FIG. 6 in the central region of the display panel, and disposing the pixel electrode PE-B having a finer pitch relatively closer to the surrounding region NDA (see FIG. 1B.), a light leakage defect at low gradations occurring in the surrounding region NDA may be improved. According to an exemplary embodiment of the inventive concept, luminance and transmittance in the same pixel region may be controlled through subdivision of pitches of the pixel electrode, and accordingly, a light leakage defect or the like at low gradations may be easily improved. However, this is illustrated by way of example, and the pixel electrode PE-B may have various shapes and is not limited to any one embodiment.

FIGS. 9A to 9D are cross-sectional views illustrating a method of manufacturing a display panel according to an exemplary embodiment of the inventive concept. An embodiment of the inventive concept is described with reference to FIGS. 9A to 9D. Meanwhile, the same reference numerals are assigned to the same components as those described in FIGS. 1A to 8B, and duplicate descriptions will not be given.

As illustrated in FIG. 9A, a color filter layer CL and a conductive layer CLL are formed on a base substrate BS. The color filter layer CL includes a first color layer CL1 formed in entire display region DA and surrounding region NDA, and a second color layer CL2 that is formed on the first color layer CL1 and overlaps the surrounding region NDA. Although not illustrated, the first color layer CL1 may include a plurality of color patterns that are disposed on the same layer and form an upper surface of the same plane. Because the first color layer CL1 and the second color layer CL2 are formed to be laminated, a step RS may be formed on the color filter layer CL.

The conductive layer CLL is formed on an entire surface of the color filter layer CL. The conductive layer CLL may be formed through a process of deposition or coating of a conductive material. The conductive layer CLL forms an upper surface reflecting the step RS generated on the color filter layer CL.

Figure 9B:
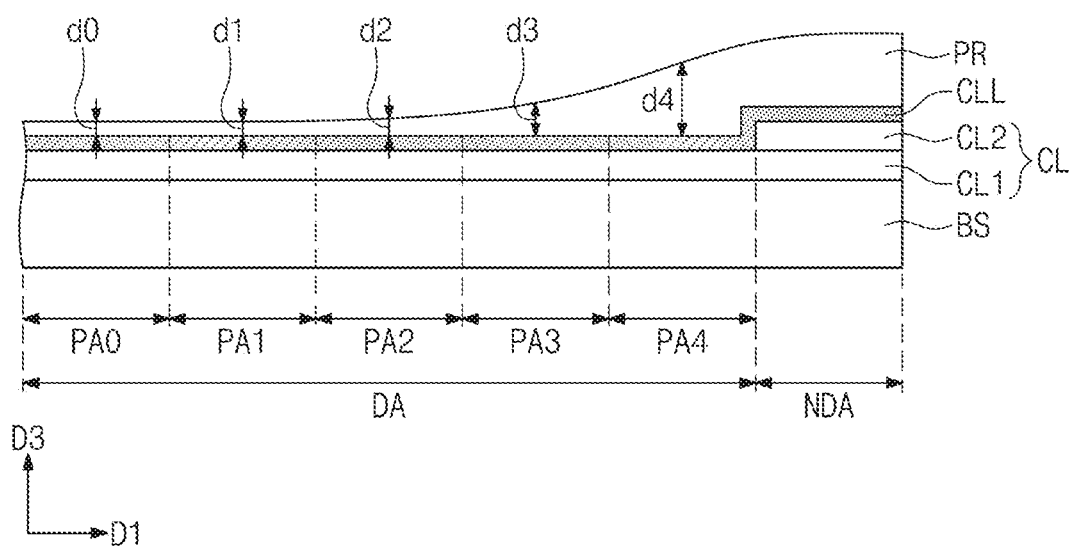

As illustrated in FIG. 9B, a photoresist film PR is formed on the conductive layer CLL. The photoresist film PR may be formed by coating an upper surface of the conductive layer CLL with a photoresist material. A photoresist material includes an organic material. The photoresist film PR may form an upper surface reflecting the step RS below.

The photoresist film PR may be formed with a thickness increasing in the display region DA as it gets closer to the surrounding region NDA having the step RS. Accordingly, when a center pixel region PA0, a first pixel region PA1, a second pixel region PA2, a third pixel region PA3, and a fourth pixel region PA4 are arranged in a direction approaching the surrounding region NDA, a thickness d4 of the photoresist film PR in the fourth pixel region PA4 disposed closest to the surrounding region NDA may be the largest, and a thickness d1 of the photoresist film PR in the first pixel region PA1 may be the smallest.

In this exemplary embodiment, the thickness d1 of the photoresist film PR in the first pixel region PA1 may be substantially the same as a thickness d0 of the photoresist film PR in the center pixel region PA0. That is, the thickness d1 of the photoresist film PR in the first pixel region PA1 may correspond to a thickness of the overall photoresist film PR in the display region DA, and thickness may gradually increase from a thickness d2 of the photoresist film PR in the second pixel region PA2, a thickness d3 of the photoresist film PR in the third pixel region PA3 to the thickness d4 of the photoresist film PR in the fourth pixel region PA4.

Figure 9C:
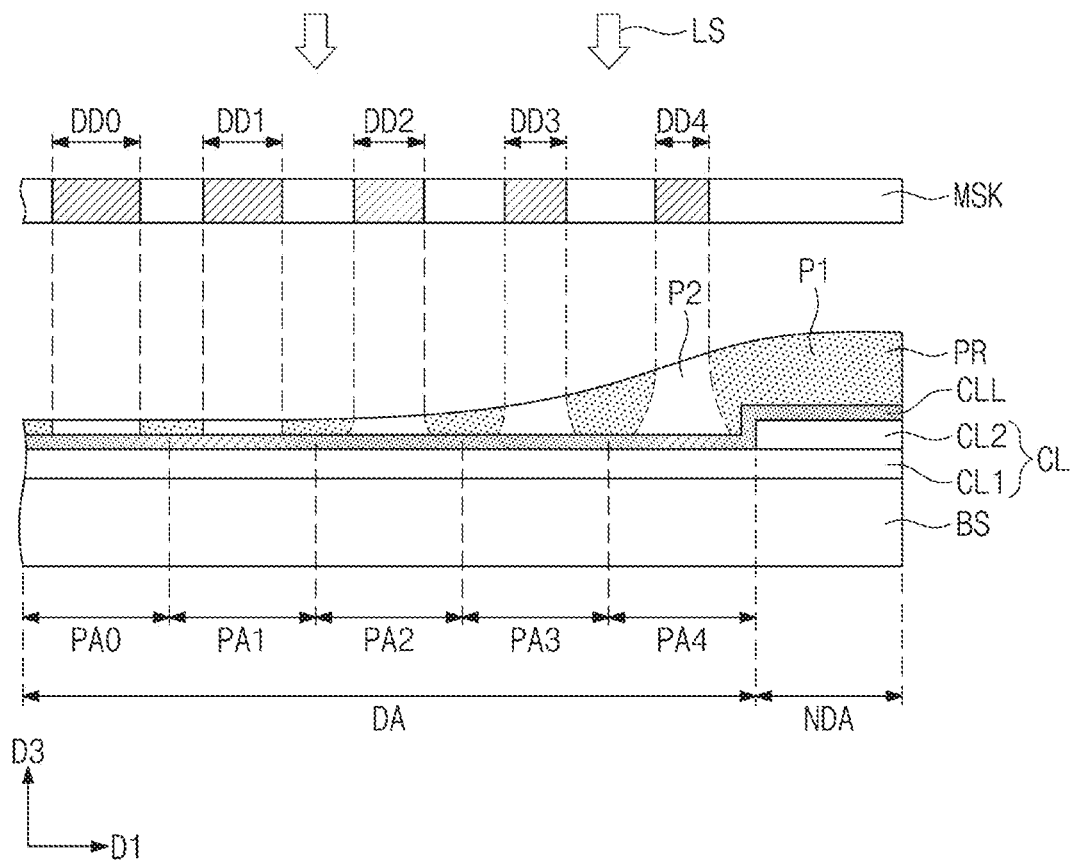
Figure 9D:
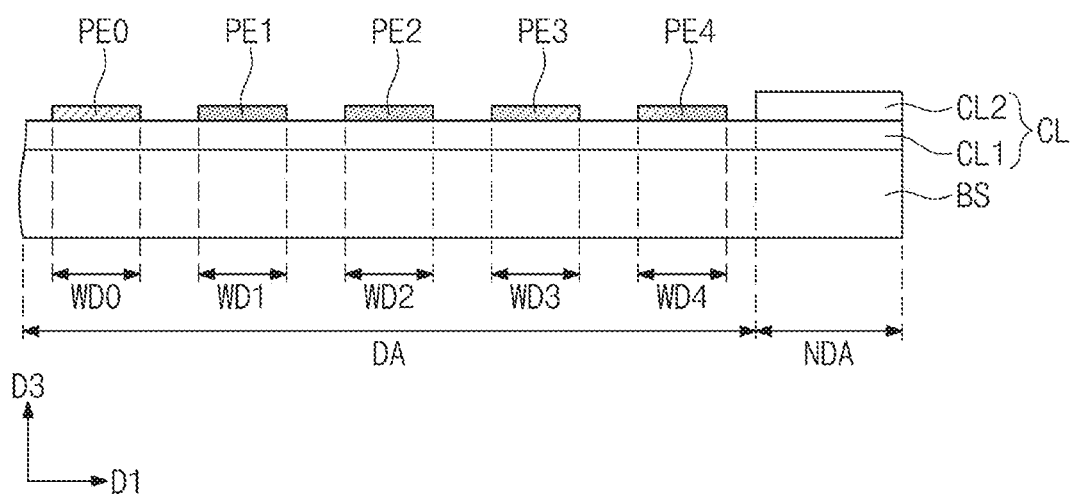

After that, as illustrated in FIGS. 9C and 9D, a plurality of pixel electrodes PE0, PE1, PE2, PE3, and PE4 are formed by patterning the conductive layer CLL through a photolithography process. For ease of description, the pixel electrodes PE0, PE1, PE2, PE3, and PE4 are illustrated as a single pattern in this exemplary embodiment. Each of the pixel electrodes PE0, PE1, PE2, PE3, and PE4 illustrated in FIG. 9D may substantially correspond to a branch of the branches illustrated in FIG. 3.

Referring to FIG. 9C, a mask MSK is provided above the photoresist film PR, and the photoresist film PR is exposed to light LS. The mask MSK includes a plurality of slit patterns. The slit patterns include a light blocking part and a light transmitting part. The photoresist film PR photoreacts with the light LS provided through light transmitting parts. In this exemplary embodiment, one light blocking part is illustrated to correspond to each of the pixel regions PA0, PA1, PA2, PA3, and PA4 for ease of description.

In this case, a photoreactive region P1 and a non-photoreactive region P2 may be formed in the photoresist film PR. For ease of description, the photoreactive region P1 is illustrated by hatching. In this exemplary embodiment, the photoreactive region P1 may be a region to be removed by a subsequent development process so as to expose the underlying conductive layer CLL, and the non-photoreactive region P2 may be a region to remain so as to cover the underlying conductive layer CLL.

The light that has passed through the light transmitting part of the mask MSK may be provided to the photoresist film PR, and enter the photoresist film PR. In this case, as the photoresist film PR is thicker, a difference between an amount of light reaching an upper surface and an amount of light reaching a lower surface may be larger. A patterning shape of the conductive layer CLL may substantially be determined by the lower surface of the photoresist film PR contacting an upper surface of the conductive layer CLL. According to an exemplary embodiment of the inventive concept, patterns of the pixel electrodes PE0, PE1, PE2, PE3, and PE4 may be formed by using a mask MSK for which a pitch of the slit patterns, i.e., a width of the light blocking part and the light transmitting part is designed differently, for a pixel region adjacent to the surrounding region NDA.

Widths DD0, DD1, DD2, DD3, and DD4 of light blocking parts may be set to be smaller as a corresponding light blocking part is closer to the surrounding region NDA. This may correspond to increasing areas of light transmitting parts as a corresponding light transmitting part is closer to the surrounding region NDA. Because the thickness d1 of the photoresist film PR of the first pixel region PA1 is substantially equal to the thickness d0 of the photoresist film PR of the center pixel region PA0, the width DD1 of the light blocking part provided to the first pixel region PA1 may be designed to be the same as the width DD0 of the light blocking part provided to the center pixel region PA0.

On the contrary, because the thickness d2 of the photoresist film PR of the second pixel region PA2, the thickness d3 of the photoresist film PR of the third pixel region PA3, and the thickness d4 of the photoresist film PR of the fourth pixel region PA4 become greater in the order listed, the width DD2 of the light blocking part provided to the second pixel region PA2, the width DD3 of the light blocking part provided to the third pixel region PA3, and the width DD4 of the light blocking part provided to the fourth pixel region PA4 may become gradually smaller in the order listed according to thickness change of the photoresist film PR.

After that, referring to FIG. 9D, the pixel electrodes PE0, PE1, PE2, PE3, and PE4 may be formed with patterns having the same width. Accordingly, a width WD4 of the fourth pixel electrode PE4 in the fourth pixel region PA4 closest to the surrounding region NDA may be formed to be substantially the same as a width WD0 of the center pixel electrode PE0 in the center pixel region PA0.

According to an exemplary embodiment of the inventive concept, by differentially designing the light blocking part of the mask MSK corresponding to a pixel region adjacent to the surrounding region NDA, the pixel electrodes having uniform shapes in the entire display region DA may be easily designed despite the step RS formed in the surrounding region NDA or a non-uniform thickness of the photoresist film PR according thereto.

According to an exemplary embodiment of the inventive concept, the display panel may be manufactured to display uniform luminance irrespective of the step, by designing, in a variety of structures, the pixel electrode formed on the color filter layer with the step. In addition, a light leakage defect or the like that may occur around the display region at low gradations may be reduced.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display panel comprising:
   a base substrate comprising a first region and a second region adjacent to the first region;
   a color filter layer including a first color layer overlapping the first region and the second region, and a second color layer disposed in the second region and on the first color layer;
   a first pixel electrode disposed on the color filter layer and in the first region; and
   a second pixel electrode disposed in the first region and between the first pixel electrode and the second region,
   wherein:
   the first pixel electrode comprises first branches spaced apart at a first pitch, and second branches spaced apart at a second pitch different from the first pitch;
   the second pixel electrode comprises third branches that are spaced apart at a third pitch and extend in the same direction as the first branches, and fourth branches that are spaced apart at a fourth pitch different from the third pitch and extend in the same direction as the second branches;
   the first pitch and the third pitch are different from each other; and
   a ratio of an area occupied by the second branches to an area occupied by the first branches is different from a ratio of an area occupied by the fourth branches to an area occupied by the third branches
   wherein the first color layer has the same color in a region overlapping the first pixel electrode and a region overlapping the second pixel electrode.

2. The display panel of claim 1, further comprising a third pixel electrode disposed between the first pixel electrode and the second pixel electrode,
   wherein:
   the third pixel electrode comprises fifth branches that extend in the same direction as the first branches and have a fifth pitch, and sixth branches that extend in the same direction as the second branches and have a sixth pitch; and
   the fifth pitch has a value between the first pitch and the third pitch.

3. The display panel of claim 1, wherein the color filter layer comprises a step formed between the first region and the second region.

4. The display panel of claim 1, wherein the first color layer has a red color in the second region, and the second color layer has a blue color.

5. The display panel of claim 1, wherein:
   the second pitch is greater than the first pitch, and the fourth pitch is greater than the third pitch; and
   the ratio of the area occupied by the fourth branches to the area occupied by the third branches is greater than the ratio of the area occupied by the second branches to the area occupied by the first branches.

6. The display panel of claim 5, wherein the ratio of the area occupied by the second branches to the area occupied by the first branches is 1:1.

7. The display panel of claim 1, wherein:
   the first pixel electrode further comprises first additional branches having a first sub-pitch different from the first pitch and the second pitch; and
   the second pixel electrode further comprises second additional branches that are configured to extend in the same direction as the first additional branches and have a second sub-pitch different from the third pitch and the fourth pitch.

8. The display panel of claim 7, wherein the first sub-pitch is greater than the first pitch and the second pitch, and the second sub-pitch is greater than the third pitch and the fourth pitch.

9. The display panel of claim 1, wherein widths of the third branches are greater than widths of the first branches.

10. The display panel of claim 9, wherein the second pitch is greater than the first pitch.

11. The display panel of claim 10, wherein:
the widths of the first branches are the same as widths of the second branches; and
the widths of the third branches are the same as widths of the fourth branches.

* * * * *